United States Patent [19]
Uram

[11] 4,168,608
[45] Sep. 25, 1979

[54] COMBINED CYCLE ELECTRIC POWER PLANT WITH COORDINATED STEAM LOAD DISTRIBUTION CONTROL

[75] Inventor: Robert Uram, E. Pittsburgh, Pa.
[73] Assignee: Westinghouse Electric Corp., Pittsburgh, Pa.
[21] Appl. No.: 564,561
[22] Filed: Apr. 2, 1975
[51] Int. Cl.² .......................... F02C 7/02; F02C 9/02
[52] U.S. Cl. ............................ 60/39.03; 60/39.18 B
[58] Field of Search ............... 60/39.18 B, 39.03; 122/7 R, 7 B; 290/40 R

[56] References Cited
U.S. PATENT DOCUMENTS

| 3,552,872 | 1/1971 | Gins et al. | 415/17 |
| 3,762,162 | 10/1973 | Miura et al. | 60/39.18 B |
| 3,866,109 | 2/1975 | Reed et al. | 60/39.28 R |
| 3,879,616 | 4/1975 | Baker et al. | 290/40 R |

Primary Examiner—Louis J. Casaregola
Attorney, Agent, or Firm—E. F. Possessky

[57] ABSTRACT

A combined cycle electric power plant includes gas and steam turbines and a steam generator for recovering the heat in the exhaust gases exited from the gas turbine and for using the recovered heat to produce and supply steam to the steam turbine. The steam generator includes a superheater tube through which a fluid, e.g. water, is directed to be additionally heated into superheated steam by the exhaust gas turbine gases. An afterburner further heats the exhaust gas turbine gases passed to the superheater tube. The temperature of the gas turbine exhaust gases is sensed for varying the fuel flow to the afterburner by a fuel valve, whereby the temperatures of the gas turbine exhaust gases and therefore of the superheated steam, are controlled. Loading and unloading of the steam turbine is accomplished automatically in coordinated plant control as a function of steam throttle pressure.

15 Claims, 22 Drawing Figures

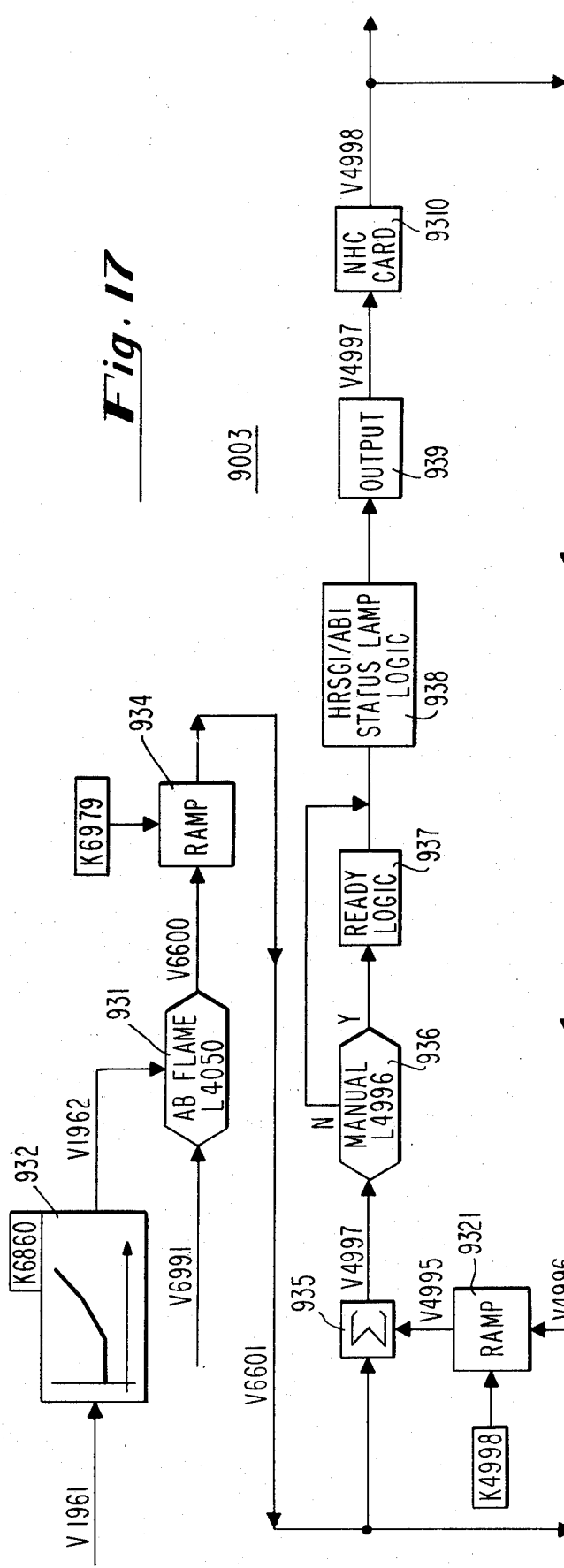
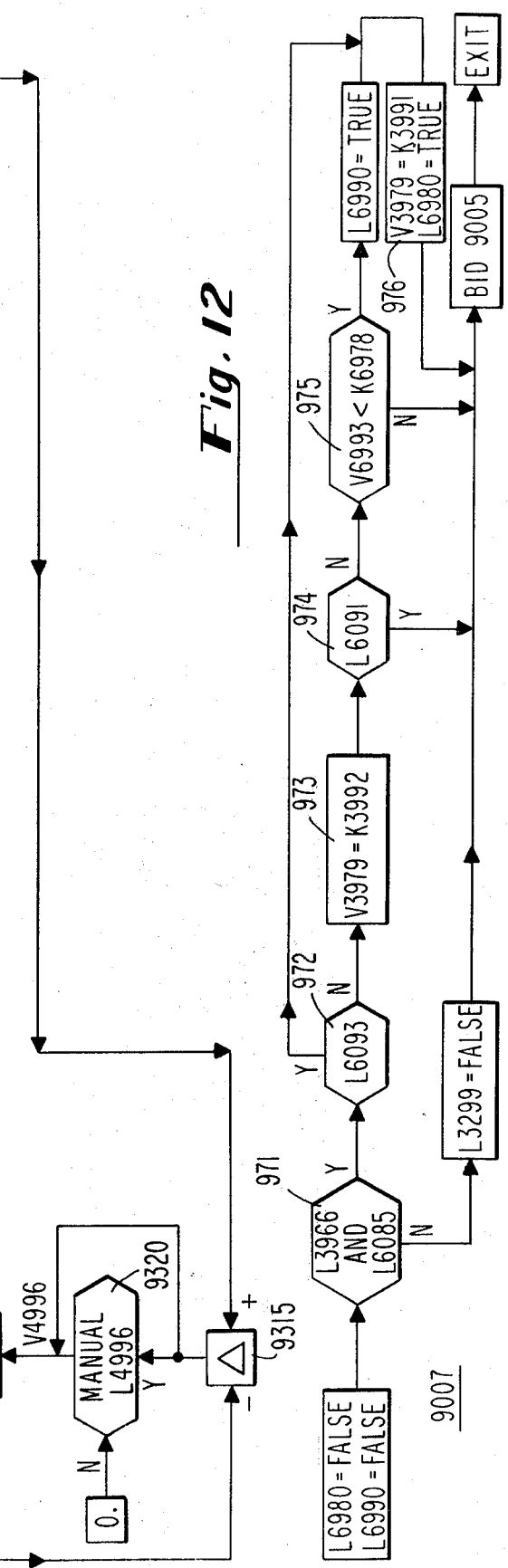
Fig. 17
Fig. 12

COMBINED CYCLE ELECTRIC POWER PLANT WITH COORDINATED STEAM LOAD DISTRIBUTION CONTROL

CROSS REFERENCE TO RELATED APPLICATIONS

Reference is made to the following co-assigned and copending applications which are hereby incorporated by reference:

(1) S.N. 399,790 filed by L. F. Martz et al on Sept. 21, 1975.

(2) S.N. 495,723

(3) S.N. 495,765

Reference is also made to related applications referred to in the above applications, which related applications are also incorporated by reference. Reference is also made to the concurrently filed and co-assigned patent applications Ser. Nos. 564,563, 564,562, 564,571, and 564,572. These applications describe distinctly different features of a combined cycle electric power plant with digital coordinated control.

BACKGROUND OF THE INVENTION

1. Field of the Invention

The present invention relates to a combined cycle electric power plant and more particularly to improved coordinated steam load distribution control in a combined cycle plant.

2. State of the Prior Art

In the design of modern electric power plants, it is a significant object to achieve the greatest efficiency possible in the generation of electricity. To this end, steam generators are designed to extract heat efficiently from and to use the extracted heat to convert a fluid such as water into superheated steam at a relatively high pressure. Further, such steam generators have been incorporated into combined cycle electric generating plants including both gas and steam turbines wherein the exhaust gases of the gas turbine are used to heat water into steam then to be transferred to the steam turbine. Typically, steam generators include a water heating section or economizer tube, a high pressure evaporator tube and finally a superheater tube, whereby water is gradually heated while increasing levels of pressure are applied thereto to provide from the superheater tube, superheated steam to supply the steam turbine. A condenser is associated with the steam turbine to receive the spent steam therefrom and for converting it into water condensate to be fed back to the steam generator.

In a combined cycle electric power plant, the steam turbine is combined with a gas turbine whereby the heated exhaust gases of the gas turbine, otherwise lost to the atmosphere, are used to heat the circulated fluid and to convert it into steam to drive the steam turbine. In this manner, a significant reduction in the fuel required to heat the steam is achieved and the heat contained in the gas turbine exhaust gases is effectively utilized. Further, an afterburner associated with the exhaust exit of the gas turbine serves to additionally heat the gas turbine exhaust gases, whereby the heat required to generate sufficient steam to meet load requirements is provided. In particular, under conditions of relatively high loads, wherein the heat of the gas turbine exhaust gases is insufficient to supply the steam requirements, the afterburner is turned on to further heat the gas turbine exhaust gases.

In combined cycle operation, there is a particular need to coordinate the control of the separate turbines, as well as the control of the afterburners. It is desired that the steam turbine be operated in what is called a "turbine following" mode whenever the plant is supplying electrical power to a load, such that the steam turbine follows the gas turbines, with each afterburner positively following a respective gas turbine. In this mode, the steam produced by the gases exhausted by the afterburners is used in total by the steam turbine. In distributing load among the operating turbines, and determining the load change rates for the respective turbines when responding to changed plant demand, there must be coordinated control so as to optimize efficiency and response time. Further, there is required a control system which can automatically determine which turbines and/or afterburners are in condition for coordinated control, or have been selected for coordinated control, and proceed with any combination thereof in coordinated control while other elements are simultaneously under a lower level of control. Desirably, the coordinated control flexibility is available through startup, synchronization, and the full range of plant loading.

In the loading of the steam turbine of a combined cycle plant, it is desirable that the steam turbine be automatically loaded subject only to the overall plant load demand, i.e., that the distributive share of the plant load carried by the steam turbine be automatically controlled as the steam turbine follows the gas turbines. In such automatic loading, or unloading, of the steam turbine, the load change rate should be subject only to monitored turbine operating conditions, e.g., steam throttle pressure.

Reference is made to the above-listed copending applications dealing with combined cycle power plants, and particularly to the description of the prior art set forth therein under the heading "Background Of The Invention". The referenced applications, and in particular Ser. No. 399,790, describe the basic system concept of coordinated plant operation, and in particular disclose a specific analog embodiment of a coordinated system. The advantages offered by coordinated control, namely (1) better response and therefore better availability; (2) better efficiency and therefore lower cost of operation; and (3) more organized and better response to contingencies and therefore better reliability, are better achieved by incorporation of overall digital control at all levels of operation. With overall digital control, additional and improved control functions and loops can be incorporated, and the ability to switch such functions in and out of operation, i.e., system flexibility, can be vastly increased.

Reference is further made to Westinghouse Descriptive Bulletin 23-830, dated September, 1972, and entitled "PACE Automation and Control System", which bulletin is also incorporated herein by reference. The descriptive bulletin summarizes the PACE System Control, including the plant operating modes and control panel layouts.

SUMMARY OF THE INVENTION

It is the primary object of this invention to provide a coordinated control system for a combined cycle electric power plant, the plant having suitably two gas turbines and a steam turbine, which control system has a subsystem for controlling loading of the steam turbine, providing for automatic loading of such steam turbine without operator input. In furtherance of this object, the control system of this invention provides for a plurality of modes of control operation, including a completely automatic mode and an operator automatic mode, with automatic selection means for determining which mode of operation is to be followed for the steam turbine. At two levels of digital automatic control the steam turbine valves are opened or closed at a rate which is a function of determined steam throttle pressure state and stored information characteristic of the steam turbine.

At the highest level automatic mode of control, steam turbine load is coordinated with the load carried by the gas turbines, the coordinated load distribution determination being carried out together with the determination of steam turbine load or unload rate. Steam turbine loading is accomplished independently of operator input, being turned over completely to automatic digital control. When loading, the steam valves try to open completely to take the steam turbine to maximum available load, the rate of opening being controlled as a function of throttle pressure. Once the steam valves are fully opened, actual steam turbine load is determined as a following function of the gas turbine operation.

In the lower level mode of automatic operation, steam turbine load is not coordinated with the gas turbines, but load and unload rates are likewise determined by a stored program digital computer as a function of sensed steam throttle pressure. In either automatic mode of operation, coordinated load and load rate programs are carried on continuously and in sequence, and the throttle pressure state is determined periodically and in a sequence so as to provide a maximally recent determination of proper steam load or unload rate. Analog and manual control modes are also provided, with the digital automatic control having means for tracking so as to provide bumpless transfer between analog and digital control.

BRIEF DESCRIPTION OF THE DRAWINGS

FIG. 12 is a flow chart of the steam turbine load distribution portion of the coordinated control sequence.

FIG. 17 is a functional diagram of the HRSG1/AB1 control portion of the coordinated control sequence.

DESCRIPTION OF THE PREFERRED EMBODIMENT

A. General Plant Description

Figure 1:
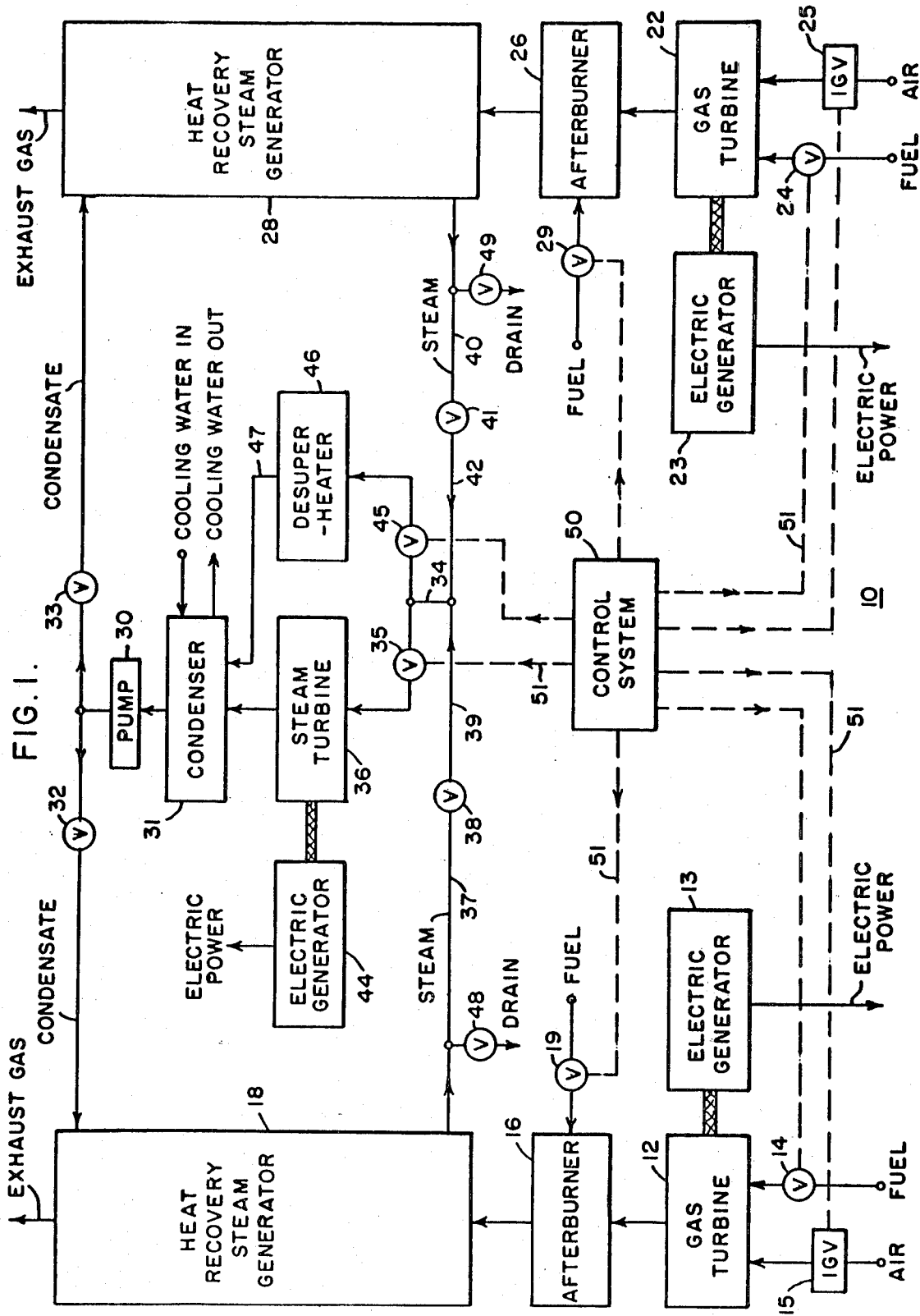
FIG. 1 is a schematic drawing showing the major operating units of a combined cycle electric power generating plant.

Referring to FIG. 1 of the drawings, there is shown a functional block diagram of a representative embodiment of a combined cycle electric power generating plant constructed in accordance with the present invention. Reference numeral 10 is used to identify the combined cycle plant as a whole. As such, the plant 10 includes a first gas turbine 12 (sometimes referred to as "gas turbine No. 1", or GT1) which drives a first electric generator 13. Fuel is supplied to the gas turbine 12 by way of a fuel control valve or throttle valve 14. Air enters the gas turbine 12 by way of a variable inlet guide vane mechanism 15 which controls the degree of opening of the turbine air intake and which is used to adjust air flow during the startup phase and to increase part load efficiency. The fuel supplied by the throttle valve 14 is burned in the gas turbine 12 and the resulting high temperature exhaust gas is passed through an afterburner 16 and a heat recovery steam generator 18 and is thereafter exhausted into the atmosphere.

Heat recovery steam generator 18 (sometimes referred to as "heat recovery steam generator No. 1", or HRSG1) includes therein various sets of boiler tubes which are heated to a relatively high temperature by the gas turbine exhaust gas passing through the steam generator 18. Afterburner 16 (AB1) includes a burner mechanism for further increasing the temperature of the gas turbine exhaust gas before it enters the steam generator 18. Fuel is supplied to the burner mechanism in the afterburner 16 by way of a fuel control valve or throttle valve 19. The primary heat source for the steam generator 18 is the gas turbine 12, the afterburner 16 being in the nature of a supplemental heat source for providing supplemental heat when needed. In terms of typical fuel usage, approximately 80% of the fuel is used in the gas turbine 12 and 20% is used in the afterburner 16.

The combined cycle plant 10 further includes a second gas turbine 22 (sometimes referred to as "gas turbine No. 2", or GT2) which drives a second electric generator 23. Fuel is supplied to the gas turbine 22 by way of a fuel control valve or throttle valve 24. Air enters the gas turbine 22 by way of a variable inlet guide vane mechanism 25 which is used to adjust air flow during turbine startup and to increase part load efficiency. The fuel supplied by throttle valve 24 is burned in the gas turbine 22 and the resulting high temperature exhaust gas is passed through an afterburner 26 and a heat recovery steam generator 28 and is thereafter exhausted into the atmosphere.

Heat recovery steam generator 28 (sometimes referred to as "heat recovery steam generator No. 2", or HRSG2) includes various sets of boiler tubes which are heated to a relatively high temperature by the gas turbine exhaust gas passing through the steam generator 28. Afterburner 26 (AB2) includes a burner mechanism for further increasing the temperature of the gas turbine exhaust gas before it enters the steam generator 28. Fuel is supplied to the burner mechanism in the afterburner 26 by way of a fuel control valve or throttle valve 29. The primary heat source for steam generator 28 is the gas turbine 22, the afterburner 26 being in the nature of a supplemental heat source for providing supplemental heating when needed. In terms of typical total fuel consumption, approximately 80% of the fuel is used in the gas turbine 22 and 20% is used in the afterburner 26.

A condensate pump 30 pumps water or condensate from a steam condenser 31 to both of the steam generators 18 and 28, the condensate flowing to the first steam generator 18 by way of a condensate flow control valve 32 and to the second steam generator 28 by way of a condensate flow control valve 33. Such condensate flows through the boiler tubes in each of the steam generators 18 and 28 and is converted into superheated steam. The superheated steam from both of the steam generators 18 and 28 is supplied by way of a common header or steam pipe 34 and a steam throttle valve or control valve 35 to a steam turbine 36 for purposes of driving such steam turbine 36. The steam from the first steam generator 18 flows to the header 34 by way of a steam pipe 37, an isolation valve 38 and a steam pipe 39, while steam from the second steam generator 28 flows to the header 34 by way of a steam pipe 40, an isolation valve 41 and a steam pipe 42.

The spent steam leaving steam turbine 36 is passed to the condenser 31 wherein it is condensed or converted back into condensate. Such condensate is thereafter pumped back into the steam generators 18 and 28 to make more steam. Steam turbine 36 drives a third electric generator 44.

A steam bypass path is provided for use at appropriate times for diverting desired amounts of steam around the steam turbine 36. This steam bypass path includes a steam turbine bypass valve 45 and a desuperheater 46, the output side of the latter being connected to the condenser 31 by way of a pipe 47. A drain valve 48 is provided for the first steam generator 18, while a drain valve 49 is provided for the second steam generator 28.

The operation of the combined cycle electric power generator plant 10 is controlled by a control system 50, typical control signal lines 51 being shown in a broken line manner. As will be seen, the control system 50 offers a choice of four different control operating levels providing four different degrees of automation. From highest to lowest in terms of the degree of automation, these control operating levels are: (1) plant coordinated control; (2) operator automatic control; (3) operator analog control; and (4) manual control. The control system 50 includes an analog control system which is constructed to provide complete and safe operation of the total plant 10 or any part thereof. The control system 50 also includes a digital computer that provides a real-time digital control system that works in conjunction with the analog control system at the higher two levels of control to coordinate and direct the operation of the analog control system. Failure of the digital control computer results in no loss of power generation because the analog control system provides for complete operation of the plant 10.

When operating at the highest level of control, namely, at the plant coordinated control level, the control system 50, among other things, automatically coordinates the settings of the fuel valves 14, 19, 24 and 29, the inlet guide vanes 15 and 25 and the steam turbine throttle and bypass valves 35 and 45 to provide maximum plant efficiency under static load conditions and optimum performance during dynamic or changing load conditions.

The control system 50 also enables a coordinated automatic startup or shutdown of the plant 10 such that the plant 10 can be brought from a hot standby condition to a power generating condition or vice versa in a quick, efficient and completely automatic manner. For example, the entire plant 10 can be started and brought to full load from a hot standby condition in approximately 60 minutes time by having the plant operator simply dial in the desired load setting and push a master plant start button.

As an indication of the flexibility and reliability of the power generating plant 10, it is noted that the plant 10 can be operated in any one of the following configurations: (1) using one steam turbine and two gas turbines; (2) using one steam turbine and one gas turbine; (3) using two gas turbines only; and (4) using one gas turbine only. The steam turbine 36 will, of course, not operate by itself, it being necessary to use at least one of the gas turbines 12 and 22 in order to use the steam turbine 36. In order to obtain the benefits of combined cycle operation, it is, of course, necessary to use the steam turbine 36 and at least one of the gas turbines 12 and 22. When one of the gas turbines, for example gas turbine 12, is not being used or is shut down for maintenance purposes, then its associated steam generator 18 can be removed from the system by closing its condensate flow valve 32 and its steam isolation valve 38. When, on the other hand, the steam turbine 36 is not being used or is shut down for maintenance purposes, the steam generated by the steam generators 18 and 28 can be bypassed to the condenser 31 by way of steam bypass valve 45 and the desuperheater 46. As an alternative, when the steam turbine 36 is not being used, either one or both of the steam generators 18 and 28 can be drained and vented by the appropriate setting of condensate valves 32 and 33, steam isolation valves 38 and 41 and drain valves 48 and 49. In other words, each of the steam generators 18 and 28 is constructed so that its respective gas turbine can be operated with the steam generator in a dry condition.

The combined cycle plant 10 affords a high degree of reliability in that failure of any one of the major apparatus components will not reduce total plant power generation capacity by more than 50%. In this regard and by way of example only, a combined cycle plant 10 has been developed having a nominal maximum power generating capacity of 260 megawatts. In such plant, each of the gas turbines 12 and 22 is capable of producing a maximum of approximately 80 megawatts of electrical power under ISO conditions (59° Fahrenheit at sea level) and the steam turbine 36 is capable of producing a maximum of approximately 100 megawatts of electrical power. Thus, loss of any one of the turbines 12, 22 and 36, for example, would not reduce total plant capacity by as much as 50%.

It is noted in passing that the functional block diagram of FIG. 1 has been simplified in some respects relative to the actual plant apparatus to be described hereinafter, this simplification being made to facilitate an initial overall understanding of the combined cycle plant 10. A major simplification in FIG. 1 concerns the fuel valves 14, 19, 24, and 29. In operation, provision is made for operating the gas turbines 12 and 22 and the afterburners 16 and 26 on either of two different kinds of fuel, namely, either natural gas or distillate type fuel oil. As a consequence, each of the gas turbines 12 and 22 and each of the afterburners 16 and 26 is actually provided with two fuel throttle valves, one for natural gas and the other for fuel oil. Also, various other valves and devices employed in the actual fuel supply systems have been omitted from FIG. 1 for the sake of simplicity. Other simplifications employed in FIG. 1 are of a similar character.

B. Combined Cycle Control Levels

Figure 2:
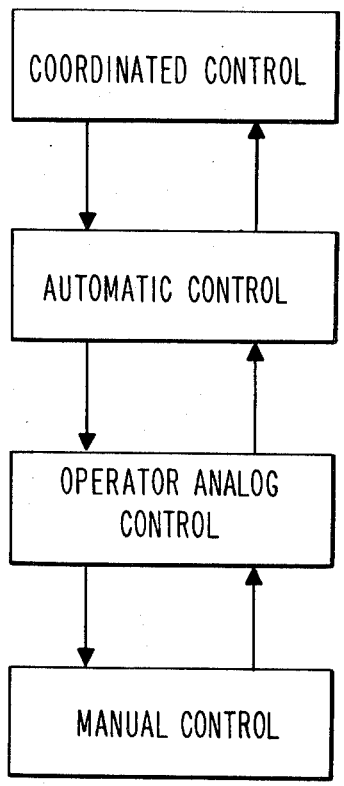
FIG. 2 is a schematic drawing showing the control levels of the control system of the combined cycle electric power generating apparatus of this invention.

Referring now to FIG. 2, there are shown the four control levels of the control system 50 of this invention. The top, or highest available level of plant control, is coordinated control. Under plant coordinated control, a digital computer generally directs the plant operation through startup, synchronization and loading to produce the plant power demand. The extent of coordinated plant control is dependent on the existing plant configuration, i.e., according to the availability of apparatus for operation or for coordinated operation. For example, if a gas turbine is shut down, it is excluded from coordination. Similarly, if the gas turbine has been excluded from coordinated control by the operator, the computer will operate accordingly, maintaining the other turbines and afterburners in coordinated control. Coordinated control provides for optimum plant performance in any selected operating configuration, i.e., any combination of selected turbines and afterburners may be under coordinated control. In this mode the digital computer can automatically bring all three turbines from hot start to synchronization to full power in about one hour, achieving optimum heat rate and producing the greatest megawatt power output from a given amount of fuel.

The next highest available level of plant operation is the automatic control, or operator automatic mode of control. In operator automatic, various control functions are performed by the programmed digital computer, providing for automatic startup and automatic loading of the gas and stream turbines under the direction of the operator on a turbine-by-turbine basis. Thus, at this level of operation, control of each of the turbines can be considered to be automatic, subject to operator setpoints, but there is no coordination of the opertion of each turbine, or the afterburners. Any part of the system may be selected by the operator for operator automatic control by use of appropriate switches in the operation control center. Under operator analog control, the analog control portion of system 50 provides for control of the plant or any part of the plant by the plant operator. In this mode, any selected plant configuration can be started up and loaded. The system is capable of accepting transfer to operator analog from the coordinated or operator automatic mode at any time. The digital and analog controls track each other, providing for bumpless transfer. Manual controls are provided for backup of the normally automatic control loops.

It is to be noted that control system 50 offers a choice of coordinated control, operator automatic control or operator analog control regardless of the combination of elements selected for power generation. It is not necessary for all the generating units in the system to operate in the same mode at the same time.

C. Plant Control System

The plant control system 50 is organized to operate the plant equipment safely through startup and loading with high reliability so that the plant is highly and quickly available to meet power demanded from it. To achieve this purpose, the plant control system is preferably embodied in digital/analog hybrid form, and the digital/analog interface is preferably disposed in a way that plant protection and plant availability are enhanced.

Generally, the total plant power is controlled by controlling the operating level of the turbines and the afterburners, but the steam turbine goes into a follow mode of operation once the steam bypass valves are closed and the steam turbine inlet valves are fully opened. In the following mode, the steam turbine produces power at a level dependent on the steam conditions generated by the heat inputs to the steam generators.

Figure 3:
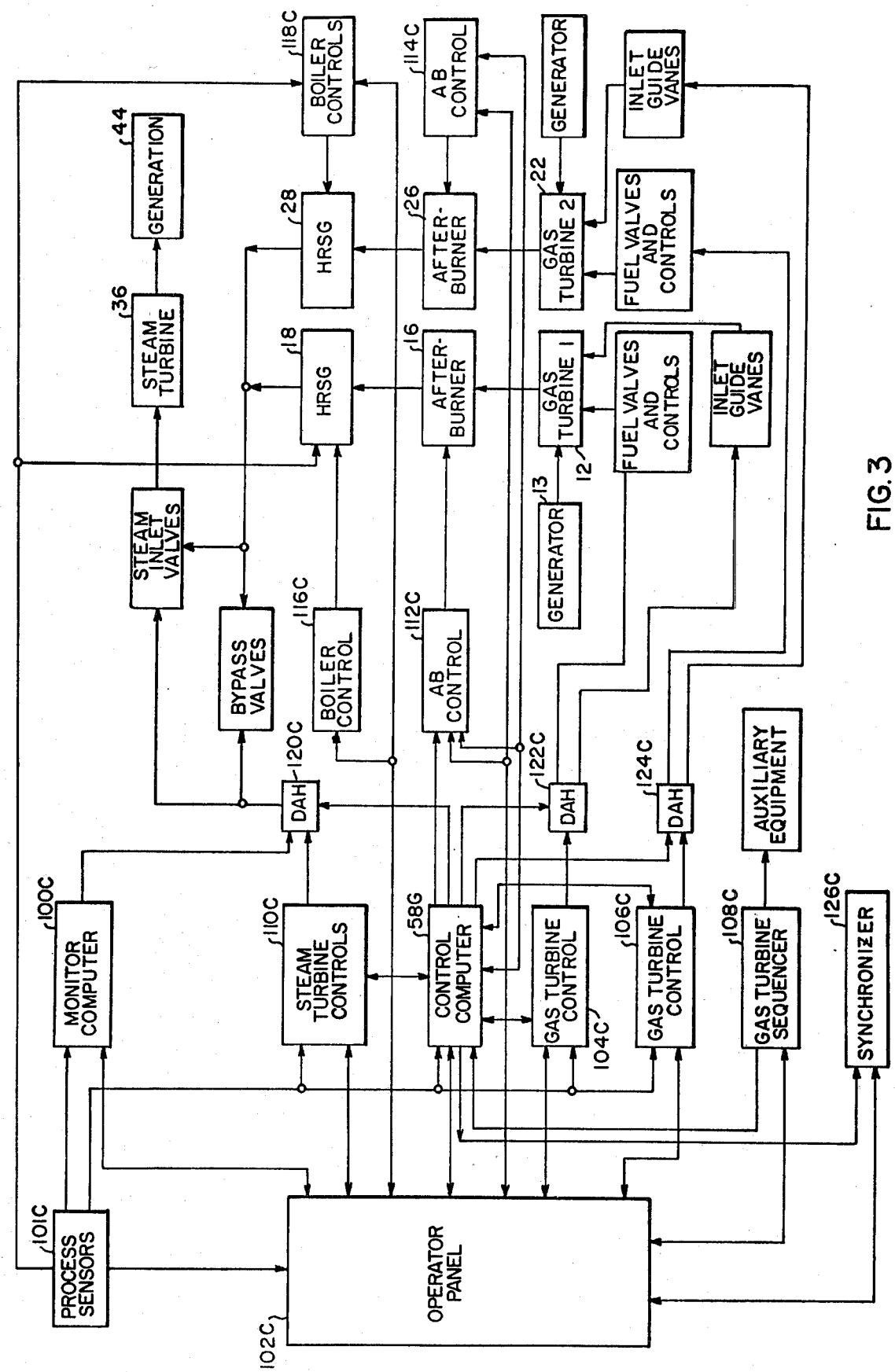
FIG. 3 is a more detailed diagram of the control system of this invention.

As shown in FIG. 3, the control system 50 includes a digital control computer 58G, a digital monitor computer 100C and various analog controls for operating the plant equipment in response to process sensors 101C while achieving the described objectives. In this instance an automatic startup control for the steam turbine 36 is largely embodied in the monitor computer 100C. An operator panel 102C provides numerous pushbutton switches and various displays which make it possible for the plant to be operated by a single person. The pushbutton switches provide for numerous operator control actions including plant and turbine mode selections and setpoint selections.

In the operator analog or manual mode of operation, the operator sets the fuel level for the gas turbines 12 and 22 and the afterburners 16 and 26 through gas turbine controls 104C and 106C during loading, but an analog startup control incuded in each of the gas turbine controls 104C and 106C automatically schedules fuel during gas turbine startups. In addition, sequencers 108C start and stop auxiliary equipment associated with the gas turbines during gas turbine startups. The turbine bypass steam flow and the turbine inlet steam flow are controlled by operator valve positioning implemented by a steam turbine control 110C during steam turbine startup and loading in the operator analog mode. Certain automatic control functions are peformed for the steam and gas turbines by the controls 104C, 106C and 110C in the operator analog mode.

In the operator automatic mode, the computers 58G and 100C perform various control functions which provide for automatic startup and automatic loading of the gas and steam turbines under the direction of the operator on a turbine-by-turbine basis. Afterburner controls 112C and 114C and boiler controls 116C and 118C operate under operator setpoint control during the operator analog and operator automatic modes.

Respective digital/analog hybrid circuits 120C, 122C and 124C interface the digital and analog controls.

Under plant coordinated control, the computer 58G performs all of the digital control functions that can be assigned to it, directing the plant operation through startup, synchronization and loading to produce the plant power demand. In all coordinated control cases, the boiler controls 116C and 118C react automatically to operator setpoints and signals generated by the process sensors 101C to control the steam generators according to plant conditions produced by coordinated turbine and afterburner operations. The computer 58G provides setpoint signals for the afterburners in the coordinated control mode but not in the operator automatic mode. The boiler controls further are supervised by the afterburner setpoint signals which are received at the analog control center. Coordinated control provides the highest available level of plant automation, and the operator automatic and operator analog modes provide progressively less automation. Some parts of the analog controls function in all of the plant modes.

Generator synchronization is performed by a synchronizer 126C under operator control or under computer control in the coordinated mode. Generally, the respective generators are sequenced through synchronization by switching actions applied to the synchronizer inputs and outputs.

Once the plant reaches hot standby and either gas turbine or both gas turbines have been started, the steam turbine can be started when minimum steam supply conditions have been reached. Thereafter, the turbines are accelerated to synchronous speed, the generators are synchronized and the fuel and steam valves are positioned to operate the turbines at the demand load levels. The manner in which the control system 50 is configured and the manner in which it functions throughout startup and loading depends on the selected plant mode and the selected or forced plant configuration and the real time process behavior.

D. Control System Hardward Components and Organization

Figure 4:
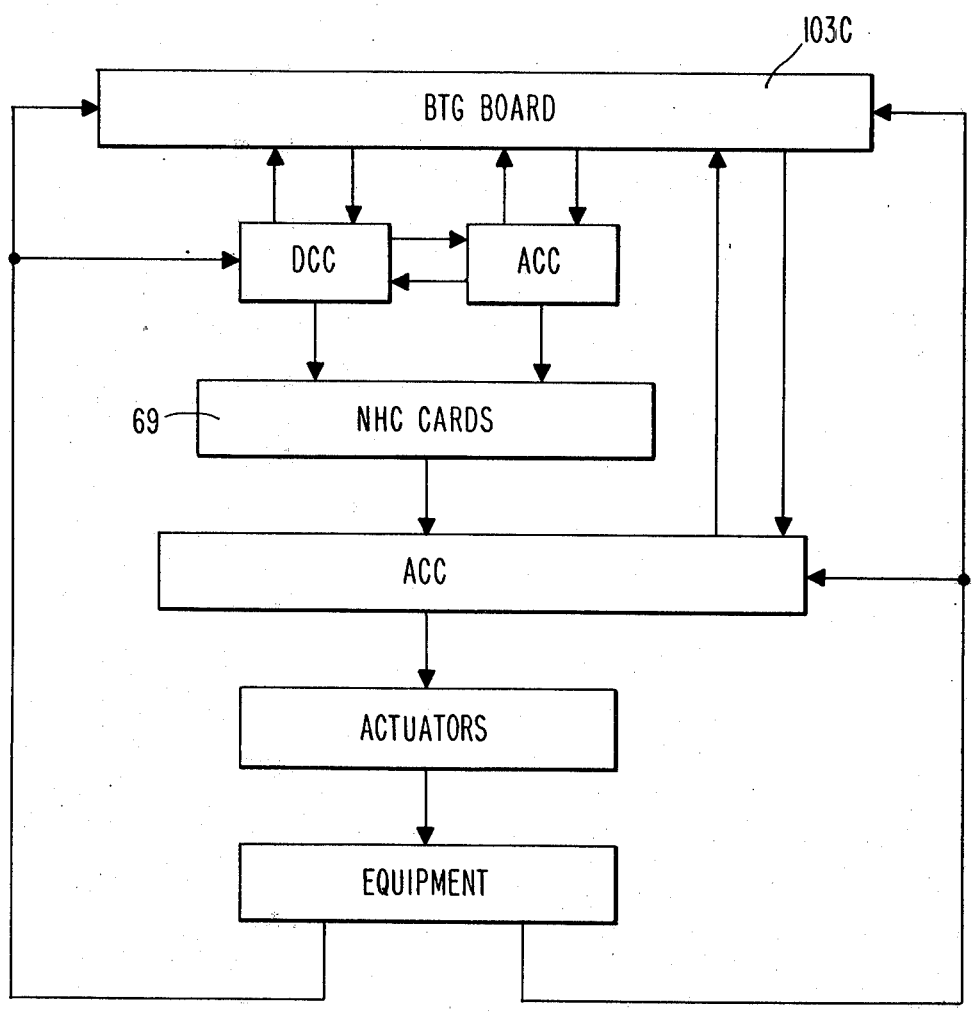
FIG. 4 is another block diagram showing the major hardware components of the control system of this invention.

Referring now to FIG. 4, there is seen a block diagram of the major hardware portions of control system 50 of this invention, in combination with the plant equipment. The BTG board 103C is the boiler/turbine/generator board which comprises push buttons for operator control of those units, and is a portion of the overall operator panel 102C. Interfacing with the BTG board is the digital control center (DCC) and the analog control center (ACC), which control centers track each other. The ACC comprises analog control circuitry and runback and permissive circuitry, as well as input/output circuitry, switching circuitry, etc. Both of these control centers output to NHC cards 69, which are a form of digital/analog interface. The output of the NHC cards is connected to a further portion of the ACC, which outputs to the equipment actuators which in turn control the plant equipment. Feedback signals of sensed equipment conditions are returned to the BTG board, the DCC and the ACC.

Figure 5:
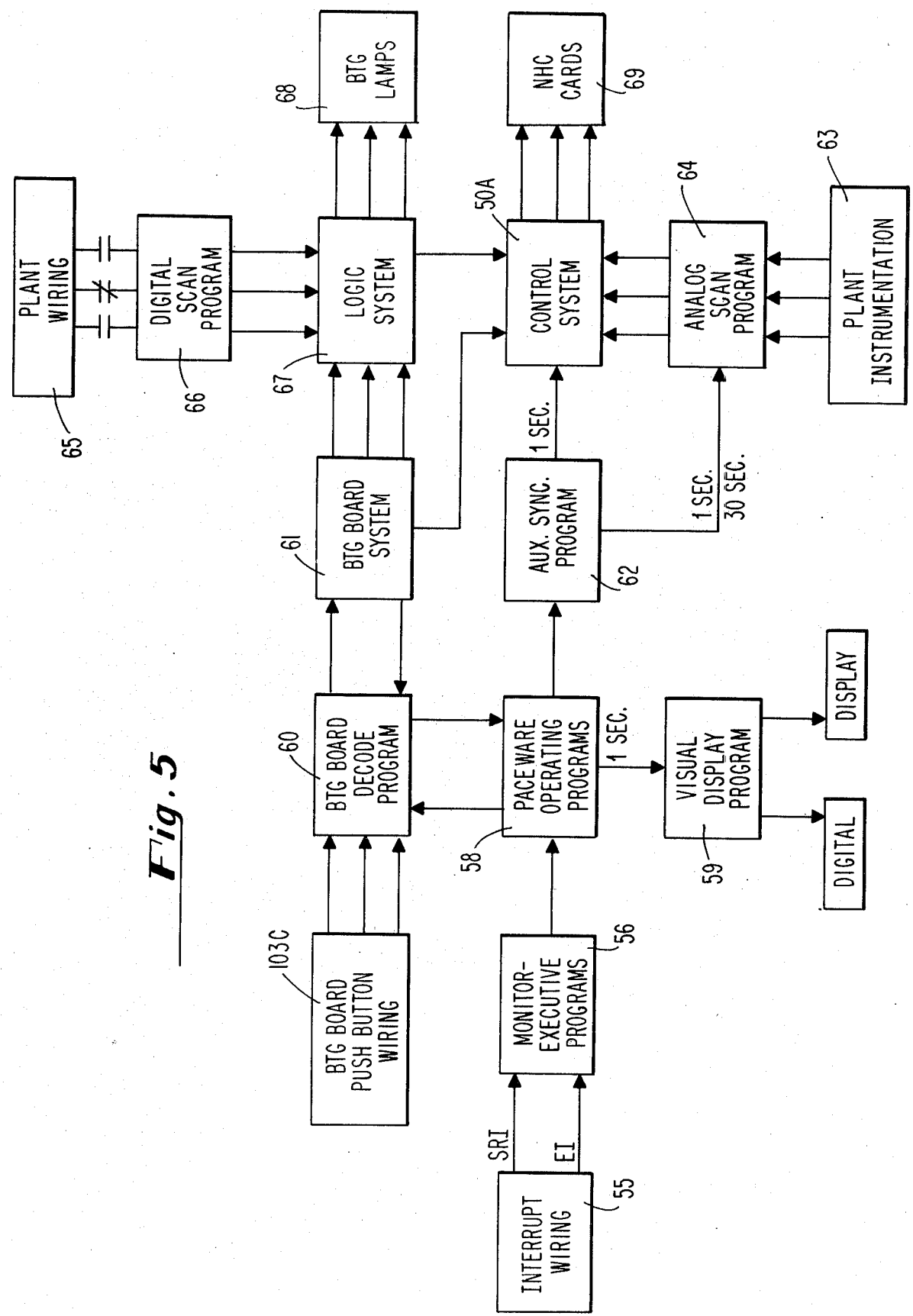
FIG. 5 is a block diagram showing the organization of the digital portion of the control system of this invention.

Referring to FIG. 5, there is shown a more specific block diagram of the digital control system organization for the digital portion of the control system of this invention. Interrupt wiring 55, e.g., contact closure outputs, are connected to monitor-executive programs 56. The connected signals include service request interrupts (SRI) and external interrupts (EI). The monitor-executive programs comprise an operating system which sets the hierarchical system for the digital computer operation, and comprises a standard package. The output from block 56 goes to block 58, designated "Paceware Operating Programs". These programs are suitably the Westinghouse PROGEN package, which performs additional functions similar to the monitor/executive programs, such as analog input scanning, and contact output bookkeeping. Every second an output is provided from block 58 to a visual display program 59, which provides for digital displays.

The BTG board push button wiring 103C inputs to the BTG board decode program 60, which provides appropriate digital signals representative of the BTG board inputs. Program 60 interacts with the BTG board system block 61, which makes responses to the signals from block 60 and passes them to logic system 67 and the control system 50A, where control signals are produced in accordance with programmed subroutines. Additional plant wiring 65 is scanned by the digital scan program 66, which provides inputs to logic 67 as well. Logic system 67 provides outputs to the BTG lamps 68, and inputs to control system 50A. System 50A is bid every second by the auxiliary sync program 62, which program also periodically bids the analog scan program 64, which derives signals from the plant instrumentation 63 and passes them through to the control system 50A. The output of system 50A is directed to the NHC cards 69, which provide appropriate analog outputs for transmission to equipment actuators.

Still referring to FIG. 5, as well as Table I set forth hereinbelow, the monitor executive programs establish a control computer priority for all digital computer operations. The priority assignment for the subject invention is set forth in Table I, level F being the highest priority, and level 0 being the lowest priority. The three control function levels are 9 (coordinated control), 8 (GT control) and 7 (ST control), the coordinated control being the highest priority.

TABLE I

| CONTROL COMPUTER PRIORITY ASSIGNMENT | | |
|---|---|---|
| Level | Function | Frequency |
| F | Contact Scan/Stop-Initialize | Demand |
| E | Auxiliary Sync | 0.1 second |
| D | Panel (BTG Board) | Demand |
| C | Analog Scan | 1/30 second |
| B | GT Logic | Demand |
| A | ST Logic | Demand |
| 9 | Coordinated Control | 1 second |
| 8 | GT Control | 1/30 second |
| 7 | ST Control | 1 second |
| 6 | Visual Display | 1 second |
| 5 | Data Link | 1 second |
| 4 | Programmers Console | Demand |
| 3 | Simulation | 1 second |
| 2 | Bootstrap | Demand |
| 1 | Loader | Demand |
| 0 | Timing Task | Free Timer |

E. Combined Cycle Digital Control System Hierarchy

Figure 6:
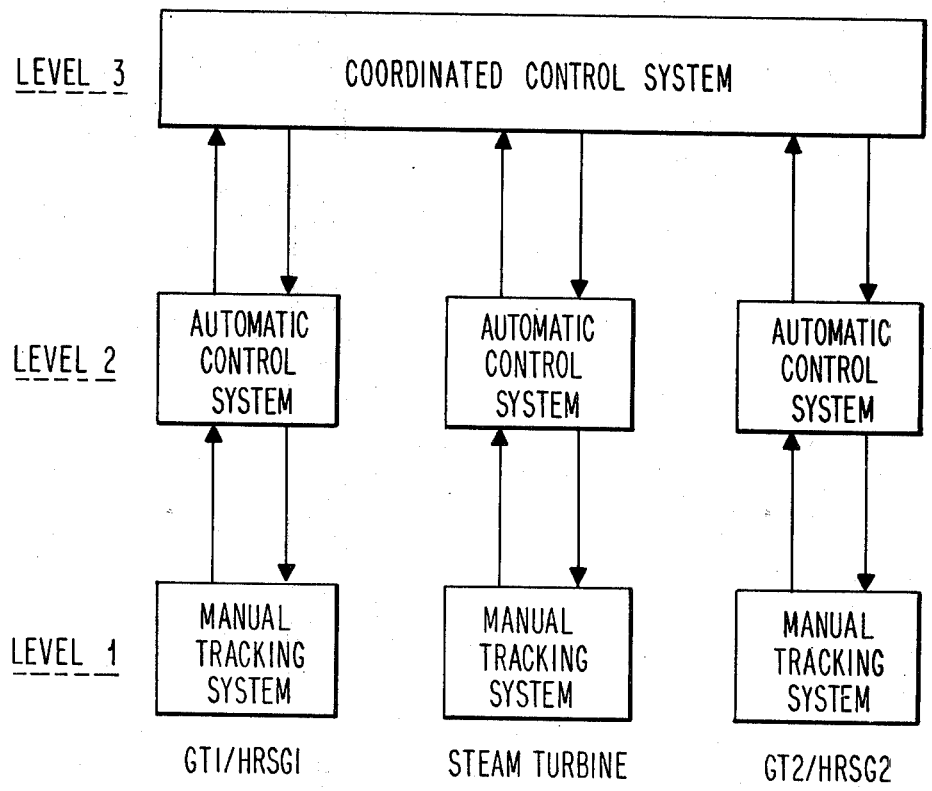
FIG. 6 is a block diagram representing the hierarchy of the digital portion of the control system of this invention.

Referring now to FIG. 6, there is shown a block diagram, representing the digital control system hierarchy of the system of this invention. At the top level is shown the coordinated control system, which as stated hereinabove is the highest level of operation. When in coordinated control, the system maximizes the extent of digital control. The second level of digital control is in operator automatic, illustrated by the three blocks titled "AUTOMATIC CONTROL SYSTEM" for each gas turbine and associated HRSG, as well as the steam turbine. Thus, when any one of the three turbines, or all three of them, are under the operator automatic mode of control, certain control functions (at the 8 level) are carried out by the digital computer. As will be expanded upon hereinafter, any combination of the three turbines and two afterburners can be in the coordinated control mode, and the others in automatic control. FIG. 6 also shows three clocks designated "manual tracking system", with arrows shown going to and from each block corresponding to the three turbines, indicating that the manual and digital control subsystems track each other, so that transfer from one to the other for any one or all of the turbines is bumpless.

F. Control System Functional Organization

Figure 7:
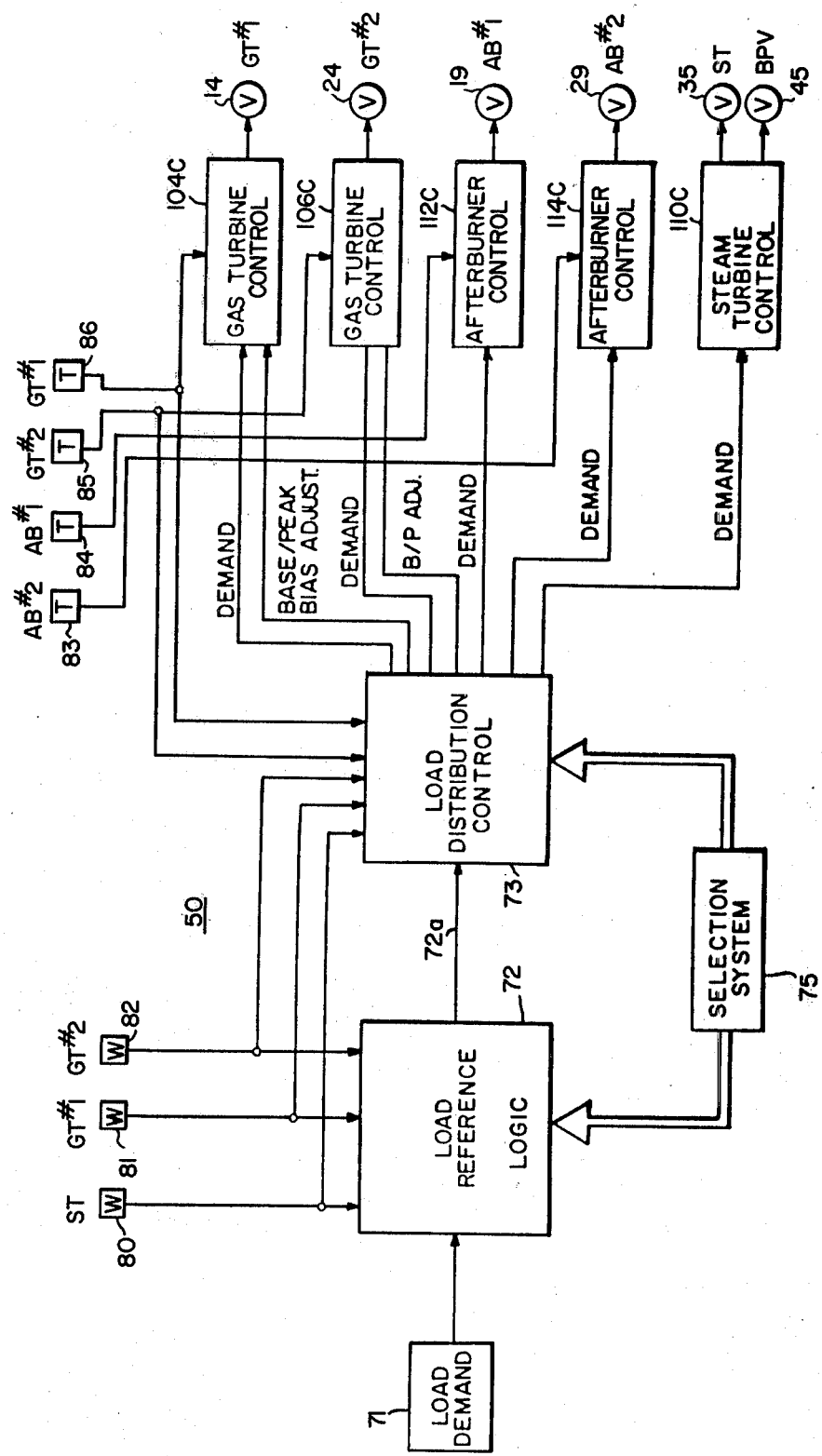
FIG. 7 is a block diagram showing a conceptual functional organization of the control system of FIG. 1, for load control operation.

Referring now to FIG. 7, there is shown in greater detail the nature of the control system 50. As indicated in FIG. 7, the control system 50 includes a load demand unit 71 which generates an electrical signal representing the desired total plant output power level. Unit 71 includes means for enabling the plant operator or engineer to change the load demand signal to any value he may wish to select. The load demand signal from unit 71 is supplied to a load reference logic unit 72 which also receives the low level output signals from the megawatt sensors 80, 81 and 82. Load reference logic unit 72 produces on its output line a load reference signal which, depending on the operating mode, may or may not be the same as the load demand signal from unit 71. The load reference signal from unit 42 is the computed signal which directs the manner in which the system will move to the load demand, and is supplied to a load distribution control unit 43.

Load distribution control 43 sends appropriate individual demand signals to a first gas turbine control 104C which drives the first gas turbine fuel valve 14, a second gas turbine control 106C which drives the second gas turbine fuel valve 24, a first afterburner control 112C which drives the first afterburner fuel valve 19, a second afterburner control 114C which drives the second afterburner fuel valve 29, and a steam turbine control 110C which controls the steam turbine throttle valve 35 and the steam bypass valve 45. Temperature indicating signals from temperature sensors 86, 84, 85 and 83 are supplied to the gas turbine control 104C, the afterburner control 112C, the gas turbine control 106C and the afterburner control 114C, respectively. Signals from temperature sensors 86 and 85 are also supplied to the load distribution control 73. Various operating modes for the load reference logic 72 and the load distribution control 73 are established by signals supplied to these units by a selection system 75.

Still referring to FIG. 7, it is to be noted that the functions of blocks 72, 73, 75, 104C, 106C, 110C, 112C and 114C are carried out by combined digital and analog circuitry, i.e., by the ACC and DCC in combination. The exact control configuration depends upon the selected mode of control, as has been discussed. The selection system 75 includes an array of backlighted push-button switches and status lights which are mounted on operator panel 102C. The specific switches, instruments and control devices have not been illustrated for the sake of simplicity.

COORDINATED CONTROL SUBSYSTEM

Coordinated Control Bidding Sequence

Figure 8:
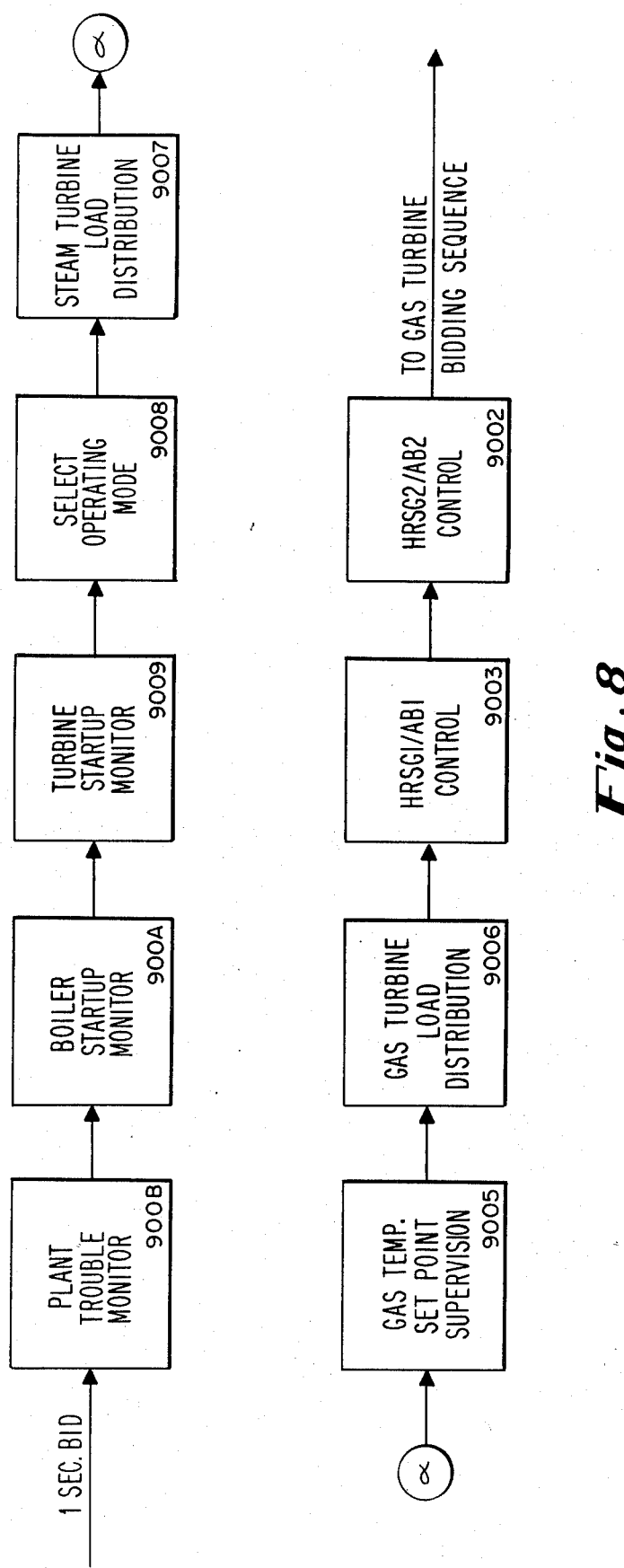
FIG. 8 is a block diagram showing the bidding sequence of the digital coordinated control operation of the system of this invention.

Referring now to FIG. 8, the coordinated control bidding sequence is shown in block diagram form. It is to be noted that each block of the bidding sequence is at a 9 level, and that as indicated in Table I this is the highest periodically bid level of the computer control system. The 9 level is bid every one second, subject to interruption by a higher level demand bid. The first program, plant trouble monitor 900B, establishes conditions for providing annunciator and typewriter messages. This is primarily a bookkeeping program. The next bid program is 900A, titled Boiler Startup Monitor, which scans logic states representative of a plurality of HRSG conditions, forms bookkeeping on the system logic states, and sets start and stop contact outputs. This program bids program 9009 just before exit.

Program 9009, the coordinated turbine startup monitor, monitors logic states of the three turbines, performs bookkeeping functions upon the process logical variables, and produces annunciator and typewriter messages. Just prior to exit, this program bids program 9008. Program 9008 is the select operating mode program, and is the primary place in the coordinated control 9 level bidding sequence where control mode bookkeeping and logic functions are performed. The program deermines whether any given ones of the turbines and afterburners are in coordinated control, and according to this determination logic steps are performed to provide for the selected coordinated control. This program also includes carrying out of the REFDMD algorithm which produces the reference signal V6992, which in FIG. 7 is the output of load reference block 72. Just prior to exit, this program bids program 9007.

Program 9007 is the steam turbine load distribution program, wherein it is determined whether the steam turbine is to load or unload. When the steam turbine unloads, it unloads to a minimum target load, where the turbine trips. If the steam turbine is in coordinated control and is to be loaded, this program calls for loading to the maximum power level, or 120 MW. As noted previously, when operating the steam turbine valves are normally called upon for wide open operation. The rate of opening, or rate of loading, is a function of curves incorporated into a lower level computer program, the 700A package. At the end of program 9007, program 9005 is bid.

Figure 9:
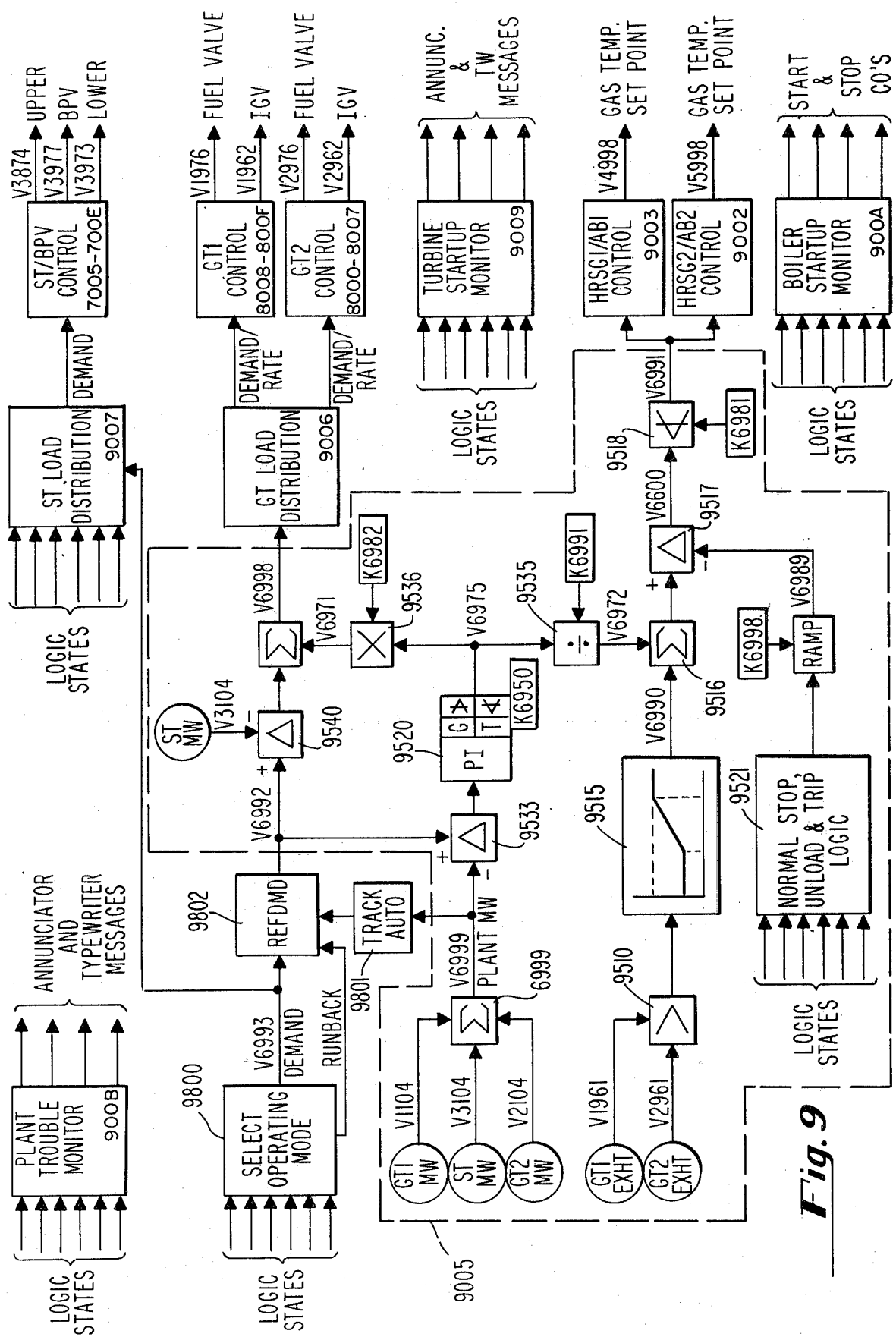
FIG. 9 is a functional block diagram of the coordinated control system.

Program 9005 is the gas temperature setpoint supervision program which is discussed functionally in connection with FIG. 9, the coordinated control functional diagram. This program generates the setpoint input signal for the HRSG/AB control programs, as well as the total GT load demand signal. Just before exit, this program bids program 9006.

Program 9006 is the gas turbine load distribution program, which checks the logical states to determine which gas turbines are in coordinated control and the state of the gas turbine breakers, and generates demand and rate signals for each gas turbine control program (which latter programs are carried out at the 8 level). Just prior to exit, this program bids program 9003, which in turn bids 9002 upon completion. Programs 9003 and 9002 are the HRSG/AB control programs, for boilers 1 and 2 respectively. These programs bookkeep respective logic conditions and pass through the gas temperature setpoint signals to the respective afterburners when appropriate. They also introduce a different setpoint in the absence of detected afterburner flame, track the setpoint when in manual control, and perform bookkeeping functions corresponding to the status of the HRSG/AB control.

In the discussion to follow of certain digital program packages of the control system of this invention, reference will be made to Process Real Variables, Process Logical Variables, and system Constants. These are set forth in the Glossary, Appendix I.

Coordinated Control Functional Arrangement

Referring now to FIG. 9, there is shown a functional diagram of the coordinated control system of this invention. The nine sub-programs as shown in the coordinated control bidding sequence, FIG. 8, are all shown in this diagram, with sub-program 9005 in particular being shown in expanded functional form. The plant trouble monitor portion, 900B, receives logic state inputs from the plant and produces annunciator and typewriter message outputs when predetermined troublesome conditions are found. Likewise, turbine startup monitor 9009 receives logic state inputs, and produces annunciator and typewriter messages during the automatic turbine startup portion of plant control. Boiler startup monitor portion 900A receives logic state inputs concerning the condition of the boiler, and produces start and stop outputs which are connected to plant contacts for direct control of the boiler. These three programs perform a variety of bookkeeping programs essentially outside of the main control loops.

The select operating mode function 9800, which is performed within program 9008, is seen to interface with the steam load distribution program 9007 and the gas temperature setpoint supervision program 9005. At block 9800, the control system checks inputs from logic states to determine exactly what operating mode is called for, and establishes corresponding logical conditions for carrying out control in the selected operating mode. Demand signal V6993 is connected through to the REFDMD block 9802, for calculating the reference signal V6992. Demand signal V6993 is also stored for use in the steam load distribution program 9007, which is bid next in the bidding sequence. The functions performed in supervision program 9005 include generation of total GT load demand signal V6998, which is stored for use in the gas turbine load distribution program 9006, and the afterburner setpoint signal V6991, which is utilized in HRSG/AB control programs 9003 and 9002. Thus, program 9005 is seen to generate process real variables which are employed in the same 9 level digital computer cycle of calculations for gas turbine load distribution and HRSG/AB control respectively.

The steam turbine load distribution program 9007 checks to see whether the steam turbine is in coordinated control, and whether other conditions are present allowing it to proceed in coordinated control. This program checks the demanded plant load and determines whether the steam turbine is to load, unload, trip out or hold. This program operates in conjunction with the 7 level ST/BPV control program, which latter control program receives the steam load demand signal from program 9007, when the steam turbine is in coordinated control. When the steam turbine is not in coordinated control, program ST/BPV Control receives its input demand signal from the automatic control softward.

Program 9006, GT Load Distribution, performs additional logic evaluation functions concerning the gas turbines, and generates demand and rate signals for use in the GT1 and GT2 control programs at the 8 level. When both gas turbines are in coordinated control they receive identical signals from program 9006. If only one gas turbine is in coordinated control, it continues to receive its setpoint signals from 9006. Either gas turbine which is operating not in the coordinated control mode, but rather in the operator automatic mode, is controlled from the blocks designated GT1 and/or GT2 control, operating at the 8 level, with the input demand/rate signals for these programs being derived through operator input and associated digital and analog control circuitry.

Control programs 9003 and 9002 operate to provide AB setpoint signals only when the corresponding afterburners are in coordinated control. Under these circumstances, these programs receive a setpoint signal, V6991 from program 9005, which is of course identical for the two programs when both afterburners are in coordinated control. There is no lower level digital computer control for the afterburners, which are either in coordinated control or operator analog control.

Referring further to the 9005 portion of the functional diagram, the megawatt signals for the three turbines are summed at 6999, generating a plant megawatt signal V6999 which is subtracted from the reference signal V6992 to provide an input error signal to controller 9520. Controller 9520 provides proportional plus integral control, in addition to high and low limiting, producing an output signal V6975. The output error signal is utilized in two control paths, namely the control path which produces the input to GT Load Distribution program 9006, as well as the control path which produces the input to the afterburner programs 9002 and 9003.

The reference signal V6992 from block 9802 is operated upon by subtracting therefrom V3104, reflecting the steam turbine megawatts, which difference is then summed with the controller signal V6975 after it has been multiplied by a scaling factor at block 9536. This summation signal, V6998, is stored for use upon execution of GT load distribution program 9006.

The gas turbine exhaust signals, V1961 and V2961, are compared at block 9510, with the larger signal being selected for the input to function generator block 9515. A block 9515, a feed-forward signal V6990 is produced, as is described more fully hereinbelow. This signal is summed with signal V6972, which in turn is derived by scaling the controller output signal V6975 at block 9535. The output of summer 9516 is operated on at block 9517, where there is subtracted a signal V6989 which is derived in accordance with an evaluation of the stop, unload and trip logic inputs to block 9521. The output of 9517 is low limited at function block 9518, before being stored for use in programs 9002 and 9003.

An overview of the coordinated control functional diagram, as seen in FIG. 9 provides insight into the operation of the control system at different control levels when in the coordinated mode, as well as when in the operator automatic mode of operation. As seen in the functional diagram, the 9 level functions are fully carried out whenever the plant is in coordinated control. However, when in operator automatic control, the demand/rate signals are generated in the 8 level and 7 level programs. Further, during such operator automatic mode of operation, the digital computer is continuously operating, checking logic conditions, and tracking the backup control system, as in fact it does in either the analog operator or manual modes of control. The reference block 9802 tracks plant megawatts through track auto block 9801, and as discussed in detail hereinbelow control programs 9002 and 9003 track the afterburner analog control signals when they are not in the coordinated mode of operation. The control functions carried out at the 8 and 7 levels can be carried out independently when the plant is in operator automatic control, or can be carried out in conjunction with the 9 level control functions when the plant is in the coordinated mode of control.

Coordinated Boiler Startup Monitor Flow Diagram, 900A

Figure 10:
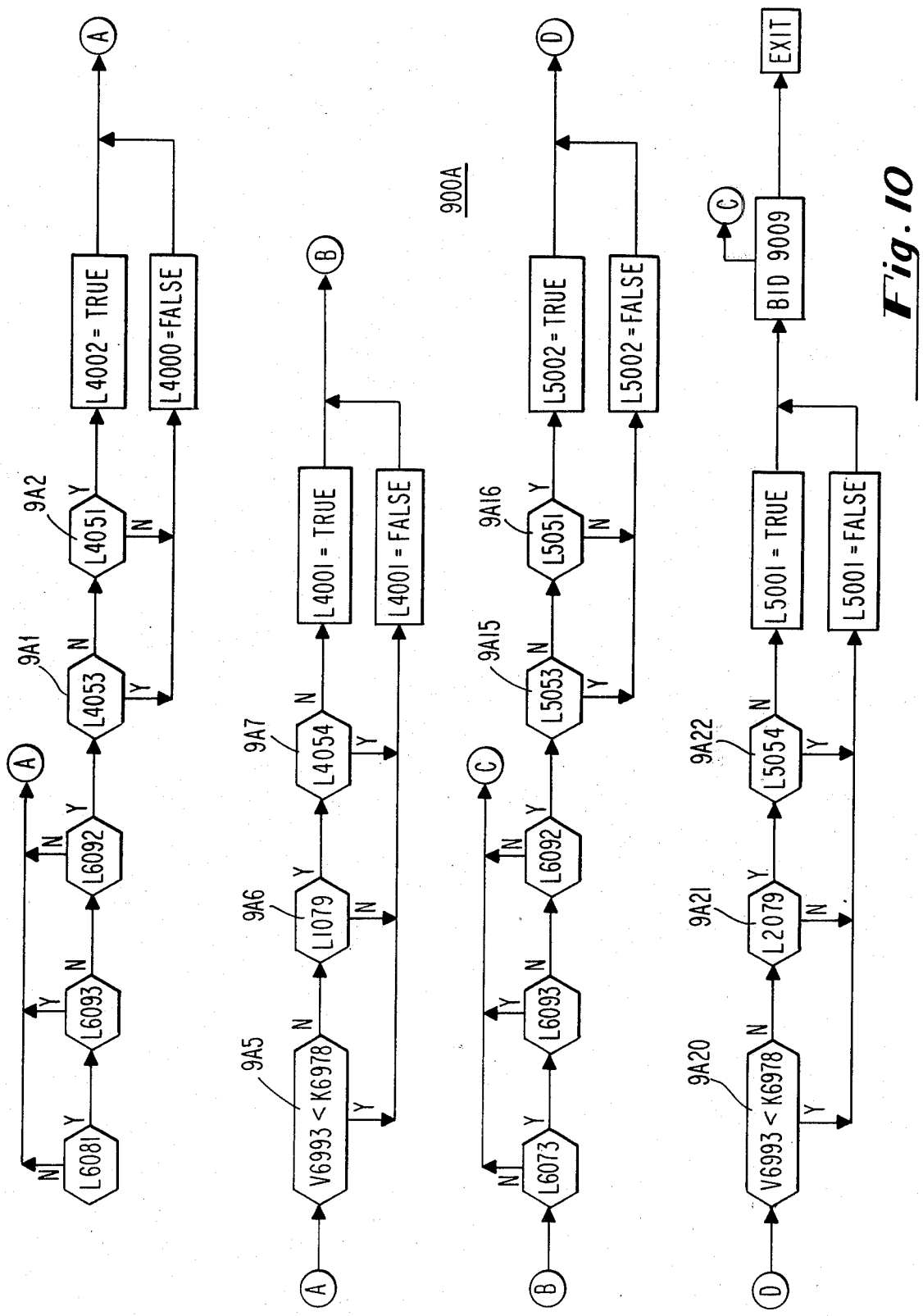
FIG. 10 is a flow chart of the boiler startup monitor portion of the control system.

Referring to FIG. 10, there is seen a flow diagram of program 900A, which provides bookkeeping for the coordinated boiler startup. At the start of the program, process logical states for the HRSG1 COORD, normal stop, and COORD go are monitored. If HRSG1 is not in COORD, the normal stop button has been pushed, or coordinated go has not been pushed, the program jumps to point A. If none of these conditions are met, the status of the HRSG run contact input is determined at 9A1. If it is found to be in the run state, it is set false. Effectively the run contact output has done its job of starting the boiler. If it is not found to be in the run state, and HRSG1 standby is found to be negative at 9A2, HRSG1 run contact output is also set false. However, if the HRSG1 run contact input is found to be negative at 9A1, but the HRSG1 standby is found to be positive at 9A2, then the HRSG1 run contact output is set true, indicating that the boiler is to be placed in the run mode by the boiler startup monitor program. Proceeding to point A, it is determined at 9A5 whether the coordinated demand signal V6993 is less than the coordinated minimum demand load with no afterburner, K6978. If the demand signal is less than K6978, process logic variable L4001, HRSG1 start AB CO, is set false, indicating that afterburner 1 is not to be started since plant demand does not require afterburners in service. If V6993 is not less than K6978, it is determined at block 9A6 whether GT1 flame is on. If it is not, L4001 is set false. If GT1 flame is found to be on, it is determined at block 9A7 whether AB1 flame is on. If it is, L4001 is set false, but if it is not it is set true. Thus, coordinated boiler startup places the boiler into service. Proceeding to point B in the 900A program, the same steps are taken for HRSG2, determining whether the HRSG2 run CO logic variable is set true or false. Following that, in a like manner as for afterburner 1, the HRSG2 start AB CO logic variable is set true or false. Programs 900B and 9009, which are not included in this specification in detailed form, provide similar bookkeeping functions.

Coordinated Select Operating Mode Program, 9008

Figure 11:
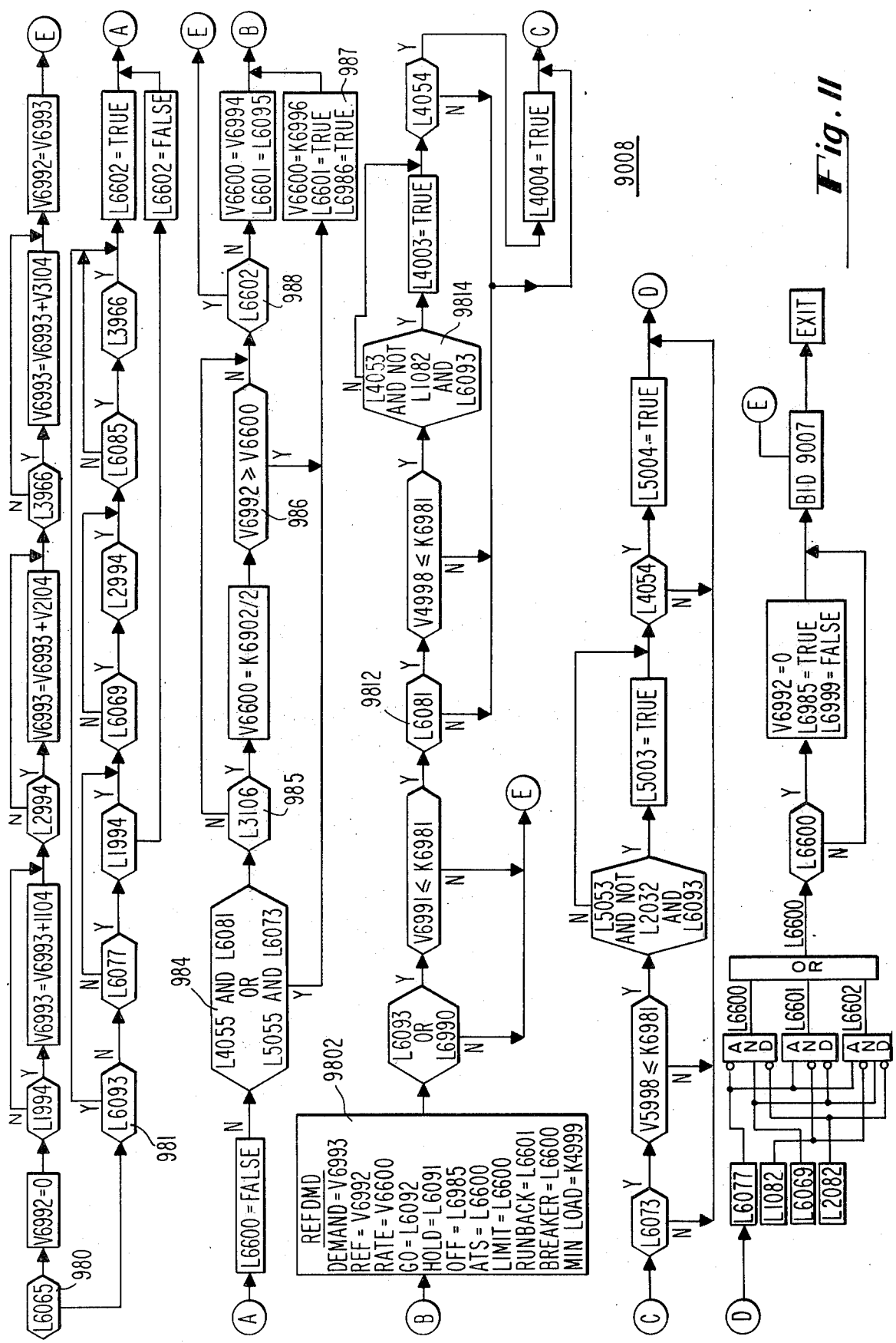
FIG. 11 is a flow chart of the select operating mode portion of the coordinated control sequence.

Referring now to FIG. 11, there is seen a flow diagram of the coordinated select operating mode package 9008. At block 980, it is determined whether the plant is in coordinated control. If no, between block 980 and exit, for each turbine having its breaker closed, i.e., supplying load, the megawatts being delivered are added, and the reference variable V6992 is set equal to the calculated total MW for up to three turbines. This represents a portion of the track auto block 9801 in FIG. 9. If the answer at block 980 is yes, the plant is in coordinated control and the program proceeds to block 981 to determine if the plant is in normal stop. If yes, logic variable L6602 is set true. If the plant is not found to be in normal stop, each turbine is checked to see if it is in coordinated control. If any one of the three turbines is in coordinated control, but its breaker is not closed, logic variable L6602 is set false. Otherwise, the variable L6602 is set true, since all three turbines are in coordinated control with their respective breakers closed. Proceeding to point A of the diagram, the portion between A and B represents coordinated control responding to plant contingencies by immediately reducing load level at a high rate. Starting at point A, logic variable L6600 is first set false. At block 984, it is determined if the HRSG1 plant runback CI is high and HRSG1 is in coordinated control, or if HRSG2 plant runback CI is high and HRSG2 is in coordinated control. If yes, the functions of block 987 are carried out, with the demand variable V6600 being set equal to the plant runback rate K6996, and logic variables L6601 and L6986 being set true. If, at block 984, the answer is no, the program checks condensate pump runback at block 985. If this condition is no, the program skips to block 988, to check the setting of L6602. If L6602 is yes, the variable V6600 is set equal to ½ plant maximum demand. Returning to block 985, if the answer is yes, V6600 is set equal to max. plant demand divided by 2. Then at block 986 it is determined whether the demand reference variable V6992 is greater than V6600. If yes, the functions of block 987 are carried out. If no, at block 988 the program checks the previously determined logic variables L6602. If this is yes, the program exits to program 9007. If no, variable V6600 is set equal to the coordinated load rate, and logic variables L6601 and L6986 are set true.

At block 9802, the REFDMD function is performed, this being the determination of the reference signal V6992 as a function of demand signal V6993 (see also FIG. 9, coordinated control functional diagram). The generation of the reference signal provides a control signal for moving the plant, or any part thereof, toward the demand. This is the same function as is carried out in block 72 of FIG. 7, and is basically a ramp signal, ramping reference to demand. The rate of the ramp is entered by the operator, or by determined dynamic conditions as in block 987. It is to be noted that the reference signal is used for both loading and unloading, and is subject to the special conditions inputted to the program, as shown in block 9802.

Following this, it is determined whether the system is in either normal stop or coordinated unload. If no, the program exits to the next program. If yes, it is determined whether the AB computer setpoint is less than or equal to the AB MIN setpoint, K6981. If no, the program exits, but if yes, it is determined at 9812 whether HRSG1 is in coordinated control. If no, it is then determined whether HRSG2 (L6073) is in coordinated control, and if neither are in coordinated control, the program goes to point D. If HRSG1 is in coordinated control, the system compares the AB1 setpoint, at the output of the NHC card, with AB MIN setpoint K6981. If it is greater, i.e., not less, the program goes to C; if less, it remains to determine if HRSG1 RUN CI is yes, and not L1082 is yes, and normal stop is yes. If this is so, HRSG1 is set on standby by making contact output L4003 true. This represents coordinated control stopping the afterburners and boilers. It is next determined whether AB1 flame is on. If it is, the system sets the AB1 STOP CO true. At point C, the same logic steps are carried out for HRSG/AB2. At point D, the system examines GT1 COORD, GT2 COORD, GT1 4x (an intermediate contact that determines whether GT1 is running), and GT2 4x. If one of the shown logic conditions exist, reference variable V6992 is set equal to zero, as the last step in a normal plant shutdown by coordinated control.

Coordinated Steam Load Distribution Program, 9007

Referring now to FIG. 12, showing program 9007, process logic variables L6980 and L6990 are initially book kept by being set equal to the false condition. At block 971, the control system determines whether the steam turbine is in coordinated control and the breaker is closed, which conditions must be met in order to proceed in coordinted control. If the answer is no, logic variable L3299 is set false, meaning that the steam turbine trip status is reset, whereby coordinated control has stopped the steam turbine in normal plant shutdown. However, if the steam turbine breaker is closed and the turbine is in coordinated control, the control program next determines, at 972, whether the normal stop button has been pushed by the operator. If the answer is yes, the program branches to block 976, sets L6980 true, such that the steam turbine is in coordinated unload status, and sets the steam coordinated demand process real variable V3979 equal to minimum steam load, which is essentially 10 MW. By this procedure, the system proceeds to unload the steam turbine. However, if the answer at block 972 is no, V3979 (steam coord demand) is set equal to the max load, at block 973. At block 974, the system determines whether the steam turbine is on coordinated hold, and if yes the program exits without doing anything further. If in hold, this means that the operator has placed the system in a hold state such that the turbine won't move until he pushes a GO button, even though the demand has been set. If it is determined that the steam turbine is not in hold, the system checks to see whether coordinated demand is less than the megawatt level requiring afterburner firing, as established by K6978. If the answer is no, the program exits. If the answer is yes, the coordinated afterburner unload process logic variable L6990 is set true, and following this the aforementioned functions of blocks 976 are carried out.

Figure 13A:
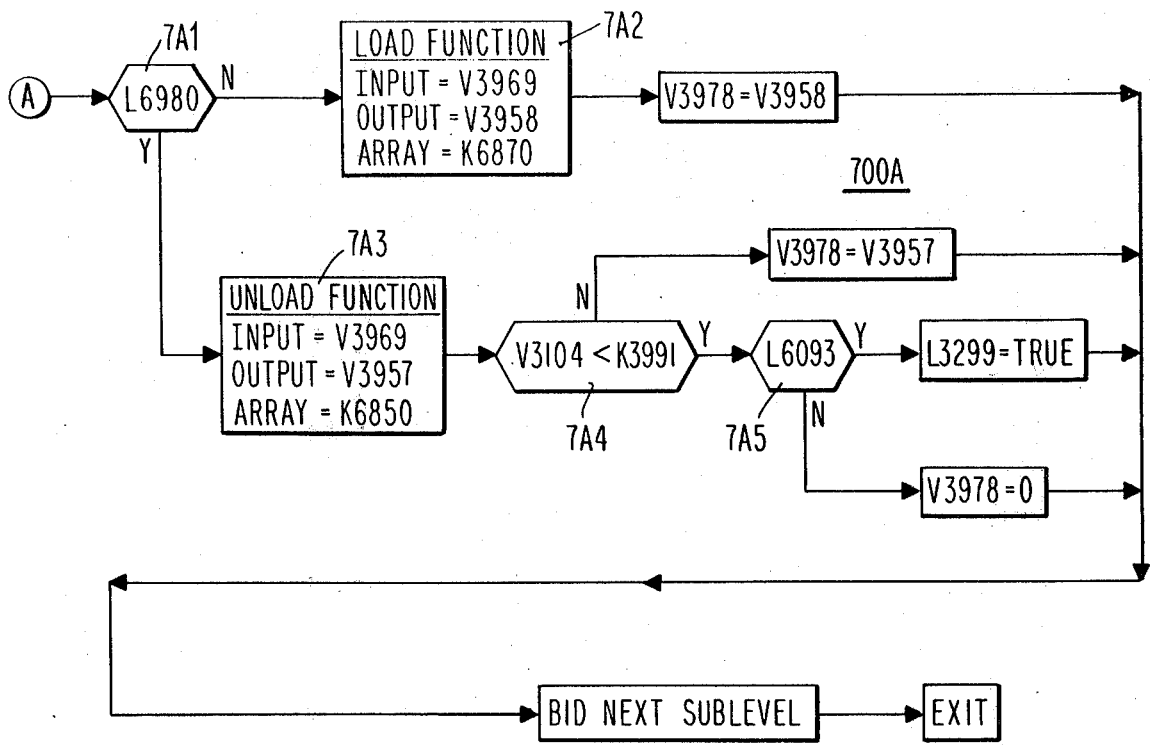
FIG. 13A is a flow chart of a portion of the steam/bypass valve control portion of the digital subsystem.
Figure 13B:
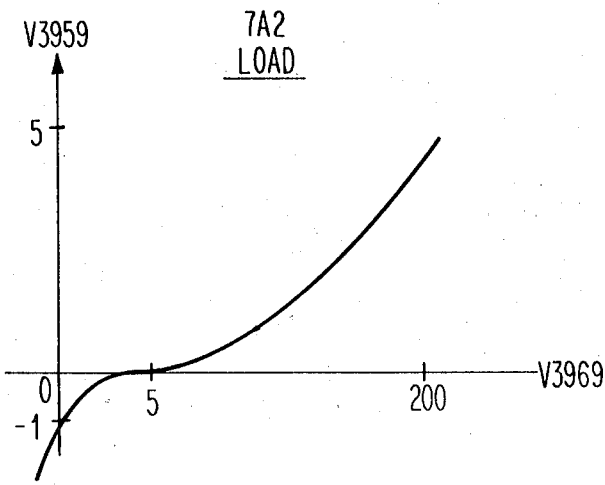
FIG. 13B is a drawing representing the load curve utilized in the control portion of FIG. 13A.
Figure 13C:
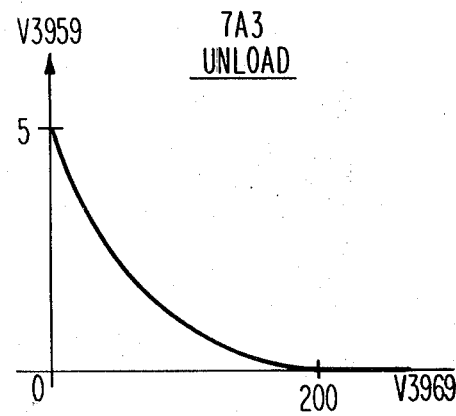
FIG. 13C is a drawing of the unload curve utilized in the control portion of FIG. 13A.

Referring now to FIG. 13A, there is seen a flow diagram of a portion of program 700A, one of a plurality of programs at the 7 level. This program is executed in both the coordinated control mode of operation and the operator automatic control mode of operation. When in coordinated control, program 700A operates in conjunction with program 9007, the two programs in combination providing the load demand and load rate setpoint signals which control the two steam turbine valves as well as the steam bypass valve. In program 700A, which is part of the steam select operating mode subprogram at the 7 level, the system first determines that the steam turbine is in coordinated mode and is not in manual control, that there is no throttle pressure runback, and that the steam breaker is closed. Following this, at block 7A1, it is determined whether the system is in coordinated steam unload. If no, meaning that the steam turbine is in coordinated load mode of operation, the load function is generated in block 72A. Referring to FIG. 13B, there is shown a curve representing the load function generated in block 7A2, the input being V3969, throttle pressure state, and the output being an intermediate variable V3958. V3969 is determined as a function of sensed steam throttle pressure, and is derived in another sublevel program not shown. It is to be noted that V3958, which is representative of loading rate, actually goes negative, thus calling for unloading, if the variable V3969 drops below a predetermined level. The stored array determining the curve of FIG. 13B is designated as K6870 and may, of course, be adjusted to adapt to the steam turbine in use. Following generation of the variable in block 7A2, the demand rate signal V3978 is set equal to V3958, certain other bookkeeping functions are performed and the next sublevel is bid before exiting. If the answer is yes at block 7A1, there is performed at block 7A3 an unload function corresponding to the load function of 7A2. The unload function is presented in FIG. 13C, the input variable again being V3969, the output variable V3957, and the stored array which determines the relationship between input and output being designated by K6850. Upon determination of the intermediate unload function at block 7A3, the system determines, at block 7A4, whether the steam turbine megawatts being produced are less than the minimum load, K3991. If no, such that unloading is to continue, the demand rate signal V3978 is set equal to the computed value of V3957. If the answer at 7A4 is yes, it is next determined, at 7A5, whether a normal stop is called for. If the answer is yes, the steam coordinated trip logic variable is set true before bidding the next sublevel. This represents coordinated control stopping the steam turbine as part of normal shutdown of the plant. If a normal stop is not called for, the demand rate signal V3978 is set equal to zero before bidding the next sublevel.

Coordinated Gas Temperature Setpoint Supervision Program, 9005

Figure 14:
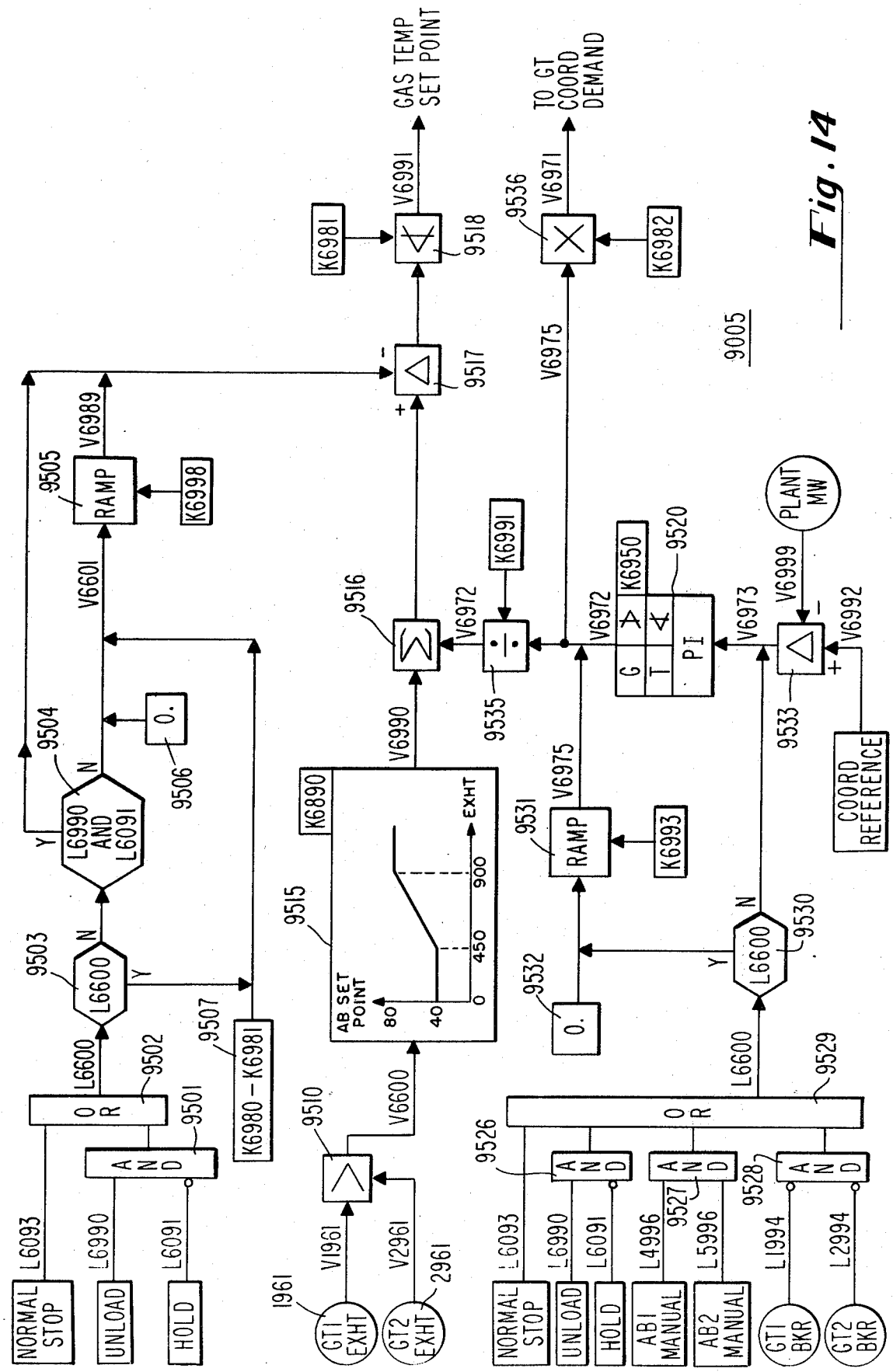
FIG. 14 is a functional diagram of the gas temperature setpoint supervision portion of the coordinated control sequence.
Figure 15:
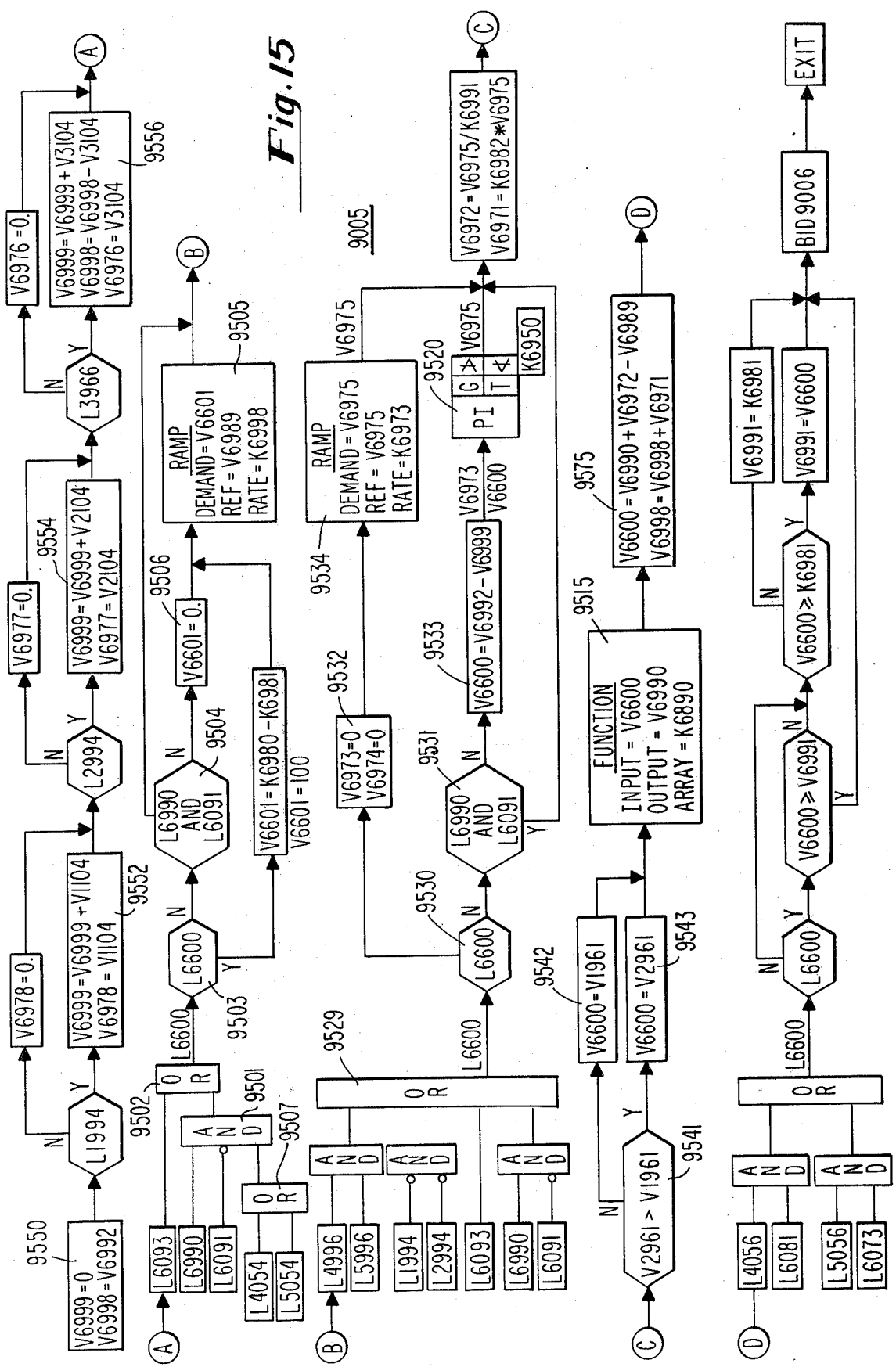
FIG. 15 is a flow chart of the gas temperature setpoint supervision portion of the coordinated control sequence.

Reference is made jointly to FIGS. 14 and 15, the functional diagram and flow chart respectively for program 9005. In the first line of the flow chart, FIG. 15, the plant megawatt (MW) signal, V6999, is obtained. This signal is first set to zero (block 9550) and then is obtained by totaling the received MW signal for the steam turbine and each of the two gas turbines, in blocks 9552, 9554, and 9556. If any of the respective turbine breakers are not closed, the corresponding turbine MW signal is set to 0. Next, the total GT load demand signal, V6998, is obtained. This is obtained by first setting it equal to the reference signal, V6992, which is obtained from the 9008 program, and then (at block 9556), subtracting the steam megawatts (V3104). Note that later in the program, at block 9575, V6998 is further modified by adding to it V6971, which is the scaled plant megawatt feedback signal from the controller. While these functions are being performed, the last MW reading is set for GT1 (V6978); GT2 (V6977); and ST (V6976).

The flow chart portion between A and B relates to the stop, unload and trip logic (block 9521 in FIG. 9), producing variable V6989. The first logical step, at block 9502, is to determine whether the system calls for either a normal stop, or for the combined condition of coordinated unload and not hold (block 9501) and also afterburner flame on in either unit (block 9507). If the first logical question is answered yes at block 9503, logic variable L6600 is set positive, which has the effect of saying to the system that you want to bring the afterburner down to minimum load. Accordingly, V6989, which is substracted from the gas temperature setpoint signal at 9517 on the functional diagram, must go to the value of afterburner temperature span max-min, such that the difference out of 9517 (FIG. 14) goes to simply AB min. This function is performed at block 9507, where V6601 is set equal to K6980 minus K6981. If the first logic statement is found to be NO at block 9503, meaning that the system doesn't want to unload, the next logical question at 9504 is whether the system is in hold. If yes, V6989 is not changed, so the program skips to point B. If the answer is no, meaning that the system is not in stop, unload or hold, V6989 is set equal to zero at 9506, such that there is no effect upon the generated setpoint signal. For any change in V6601, from block 9506 or block 9507, the change is ramped in block 9505, where the output is V6989, and the input is V6601. The ramp rate is set by constant K6998, and the output reference signal is stored.

Referring now to path B through C, this comprises the MW controller logic. The first logic condition is established as represented by four inputs to OR gate 9529. If any one of these input conditions is met, a positive logic signal L6600 is determined at block 9530, signifying that the system wants the MW feedback signal to be zero. Accordingly, in this circumstance, the input signal V6973 to the controller is set to zero (block 9532), and the controller output is ramped to zero (at block 9531). Note that in block 9532 both the last MW input signal and the MW integral signal are set to zero. With these two inputs set to zero, the megawatt controller output (V6975) is ramped to zero.

If, at block 9530, L6600 is found negative, such that the first logic condition is not met, but the system is determined at 9531 to be on unload and hold, the program does not repeat the controller calculation, but simply holds the controller output, skipping the block 9540. If the answer at block 9531 is no, such that the system is not on hold, the program performs the normal controller function. First the coordinate reference signal V6992 is adjusted at 9533 by substracting the plant megawatt signal V6999, to get a new MW error value of V6600. This value, as well as the last previous input to the controller, are operated on at controller block 9520 to get the controller output V6975. The controller output, for any logic condition, is then scaled by K6991 to get V6972, and is multiplied by K6982 to get V6971 (at block 9540). See also FIG. 9.

Still referring to FIG. 15, in the path from C to D, the program derives a gross feedforward setpoint from the gas turbine exhaust temperatures. First, the two exhaust temperature input signals are compared, at block 9541, and in blocks 9542 or 9543, variable V6600 is set equal to the selected higher temperature signal. The feedforward signal, V6990, is determined in function block 9515, as a function of input V6600 and stored array K6890 (see FIG. 9). Array K6890 is suitably set to provide a linear increase in the feedforward setpoint signal V6990 as a function of GT exhaust temperature between 450° F. and 900° F., with the generated setpoint signal suitably being held constant outside of such temperature range. However, the range may be varied, and the change within the range may be adjusted to provide other than a linear increase. The important feature of this portion of the control system is to provide a feedforward signal which is not merely proportional to the exhaust temperature, but which provides a measured interface between the GT condition and the following condition of the steam turbine, i.e., which acts to control the manner of afterburner response so as to optimally contribute to the coordinated steam turbine following operation.

In block 9575, the output of function block 9515 is added with the scaled controller signal V6972, and there is then substracted the stop/unload signal V6989. Additionally, the total gas load signal, V6998, which is inputted to program 9006, is obtained by adding to the previously computed value of V6998 the latest value of the feedback controller signal V6971.

In the path of program 9005, D to exit, the program checks to see that the gas temperature setpoint signal V6991 doesn't drop below the AB min setpoint when either GT is on coordinated control. This corresponds to the function performed at block 9518 in the 9005 functional diagram. The program then bids 9006 and exits.

Coordinated GT Load Distribution, 9006

Figure 16:
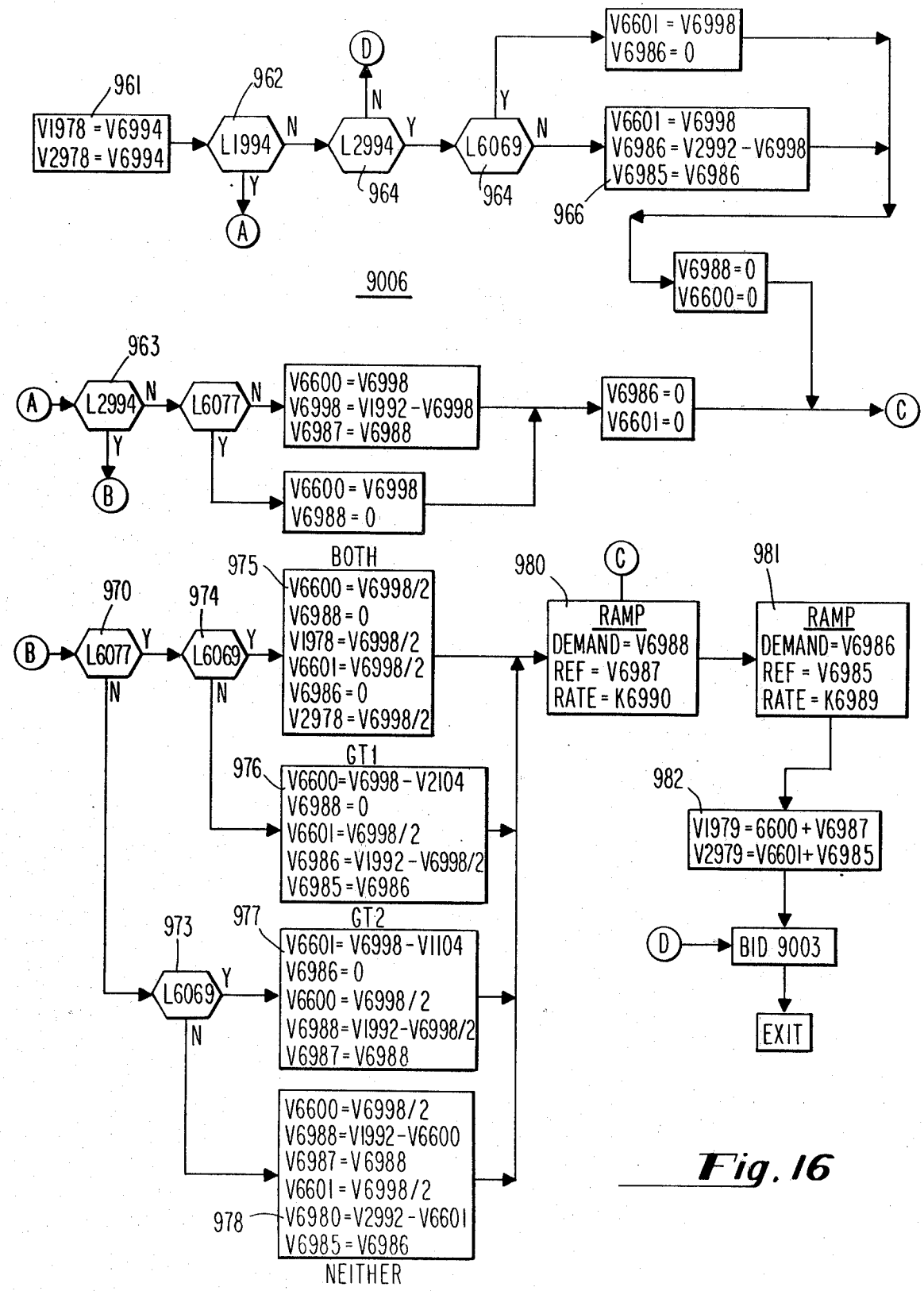
FIG. 16 is a flow chart of the gas turbine load distribution portion of the coordinated control sequence.

Referring now to FIG. 16, there is shown the flow diagram for program 9006, the coordinated GT Load Distribution program. In this program, it is determined which, if either, of the gas turbines is in coordinated control, corresponding demand and rate signals are determined for each gas turbine which is in coordinated control, and the tracking function between the automatic and coordinated control is performed. Starting at block 961, the two GT load rate signals are book kept by being set to the coordinated load rate. In block 962, it is determined whether the GT1 breaker is closed. If yes, the program goes directly to block 963 to determine if the GT2 breaker is closed, and if not, the program proceeds to block 964, where also it is determined if the GT2 breaker is closed. At block 964, if GT2 breaker is not closed, such that neither breaker is determined to be closed, the program bids program 9003 and exits. If the GT2 breaker is found closed, it is determined at block 965 whether GT2 is in coordinated control. If yes, variable 6001 is set equal to the GT load demand, which is obtained from program 9005, and the tracking bias is set equal to zero. If no, the tracking bias is computed at block 966, and ramping is provided for bumpless transfer between coordinated and automatic control. The tracking bias is established as a function of the difference between the digitally computed automatic and coordinated references.

Proceeding to point A in the flow diagram there are performed between points A and C the same functions as described hereinabove, for the second gas turbine. At point B, to which the program proceeds if both GT1 and GT2 are in the load mode, i.e., both breakers are closed, it is determined at 970 whether GT1 is in coordinated control. If yes, it is determined at block 971 whether GT2 is in coordinated control. At block 973, when GT1 is found not to be in coordinated control, it is determined whether GT2 is in coordinated control, and at block 974, when GT1 is coordinated it is determined if GT2 is coordinated. The determination of what combination of gas turbines is in coordinated control leads to four function blocks 975-978, in which process variables are determined as a function of the combination of gas turbines in coordinated control. Block 975 is the function block where both turbines are in coordinated control; block 976 where only GT1 is in coordinated control; block 977 where GT2 alone is in coordinated control; and block 978 where neither gas turbine is in coordinated control.

Referring to block 975, where both GTs are in coordinated control, the tracking biases for each are set equal to zero, the load rates are set equal to ½ total GT coordinated low rate, and the variables V6600 and V6601 are set equal to ½ total GT load coordinated load reference. In block 976, variable V6600, the GT1 demand variable, is set equal to GT demand minus GT2 MW, and the GT1 tracking bias is set equal to zero. The GT2 demand variable to set equal to ½ the GT demand.

and the GT2 tracking bias is determined. Likewise, in block 977, the GT2 demand variable is set equal to GT demand minus GT1 MW, and GT2 tracking bias is set equal to zero. The GT1 demand variable is set equal to GT demand divided by 2, and the GT1 tracking bias is determined. In block 978, the tracking bias is determined for each GT, and each GT demand variable is set equal to GT demand divided by 2.

Following the functions performed in the selected one of blocks 975–978, the GT1 tracking function is carried out in ramp block 980, and the GT2 tracking function is carried out in ramp block 981. In block 982, GT1 demand is determined as the GT1 demand variable plus GT1 tracking ramp output, and GT2 demand is determined as the GT2 demand variable plus GT2 tracking ramp output. The program then bids program 9003 and exits.

Figure 18:
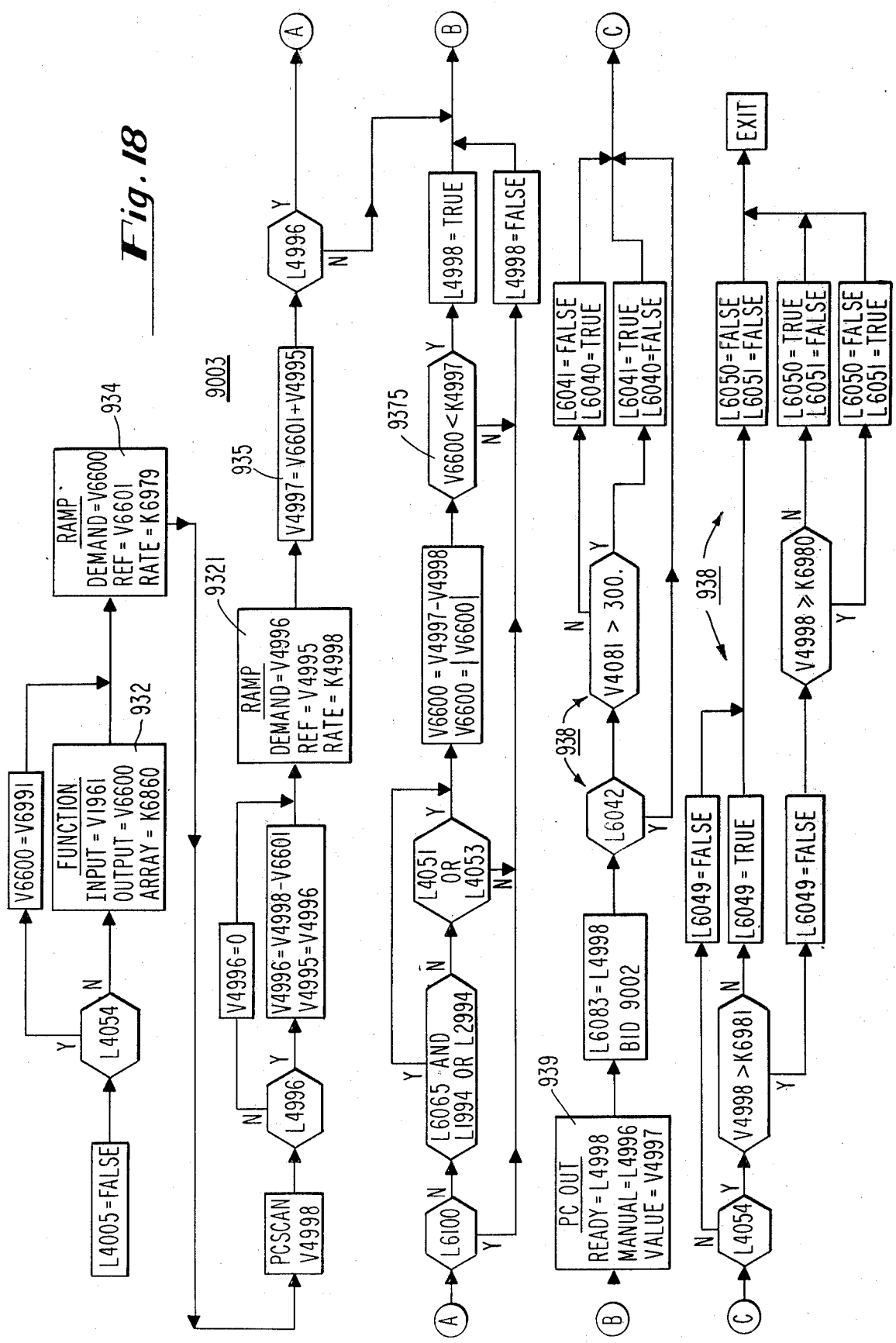
FIG. 18 is a flow chart of the HRSG1/AB1 control portion of the coordinated control sequence.

Referring now to FIGS. 17 and 18, there are shown the functional diagram and flow chart respectively of the HRSG/AB control system. As noted previously, there are respective packages 9003 and 9002 for HRSG1/AB1 and HRSG2/AB2 respectively. FIGS. 17 and 18 are presented corresponding to HRSG1/AB1, it being understood that the same diagrams exist for HRSG2/AB2 with corresponding different process real and process logical variables.

Referring first to FIG. 17, the functional diagram for the HRSG/AB control, the setpoint signal V6991 is inputted to block 931, where it is determined whether afterburner 1 flame is on. If it is, setpoint V6991 is passed straight through. However, if the afterburner flame is found not to be on, a different setpoint signal is generated at block 932, in accordance with stored array K6860. The input to array 6860 is V1961, the gas turbine 1 exhaust temperature. This array is, it is to be noted, different from the array utilized for generating signal V6990 in program 9005, the difference corresponding to the desired difference setpoint in the absence of sensed afterburner flame. The ramp function at block 934 normally passes the V6600 signal from block 931, but ramps to the new output which occurs when the condition of afterburner flame is detected to have changed. The output of ramp 934, designated as V6601, is inputted to sumation block 935, to which is inputted a tracking signal V4995, the derivation of which is discussed hereinbelow. Next, it is determined, at block 936, whether the afterburner is in the coordinated or analog mode. If in analog, certain logic functions designated "ready logic" are performed in block 937. These functions are bypassed if the after burner is in coordinated mode. Next, at block 938, certain status lamp logic functions, specified in the flow chart of FIG. 18, are performed, following which the V4997 signal is processed into the necessary bit pattern in output function block 939. This is a step in preparation for the operation at block 9310, where the digital output signal is processed in the nuclear hybrid coupler, which is a printed circuit card which couples the digital circuitry to the analog circuitry. The NHC card is disclosed and described in the referenced applications. The output from block 9310 is V4998, which is the resultant gas temperature setpoint signal which is fed to the afterburner 1, as well as to the following analog circuitry of the HRSG1. This signal is fed back to difference block 9315, to determine a difference signal for tracking between coordinated control and manual control. At block 9320 it is determined whether the after burner is in coordinated or manual control, and if in coordinated control the return signal is set to zero. If in manual control, the difference signal is fed through ramp function 9321 to block 935. In this fashion, when the after burner control is returned to the coordinated mode, the difference signal is maintained at the moment of transfer, providing bumpless transfer, and then is ramped down to zero. As seen in the flow chart of FIG. 18, as part of the ready logic block 937 it is determined at block 9375 whether V6600 is less than K4997, i.e., less than the tracking dead band. If the answer is yes, the AB1 ready for coordinated control process logic variable is set true, but if no, this logic variable is set false. Since V6600 at this point has been made equal to the absolute value of the difference between V4997 and the fed back output signal V4998, it represents an absolute value of the tracking error signal. Thus, as long as this tracking error signal is smaller than the predetermined constant, the system allows coordinated control, thus avoiding the tracking dead band range.

Coordinated Control Panel Selection

Figure 19:
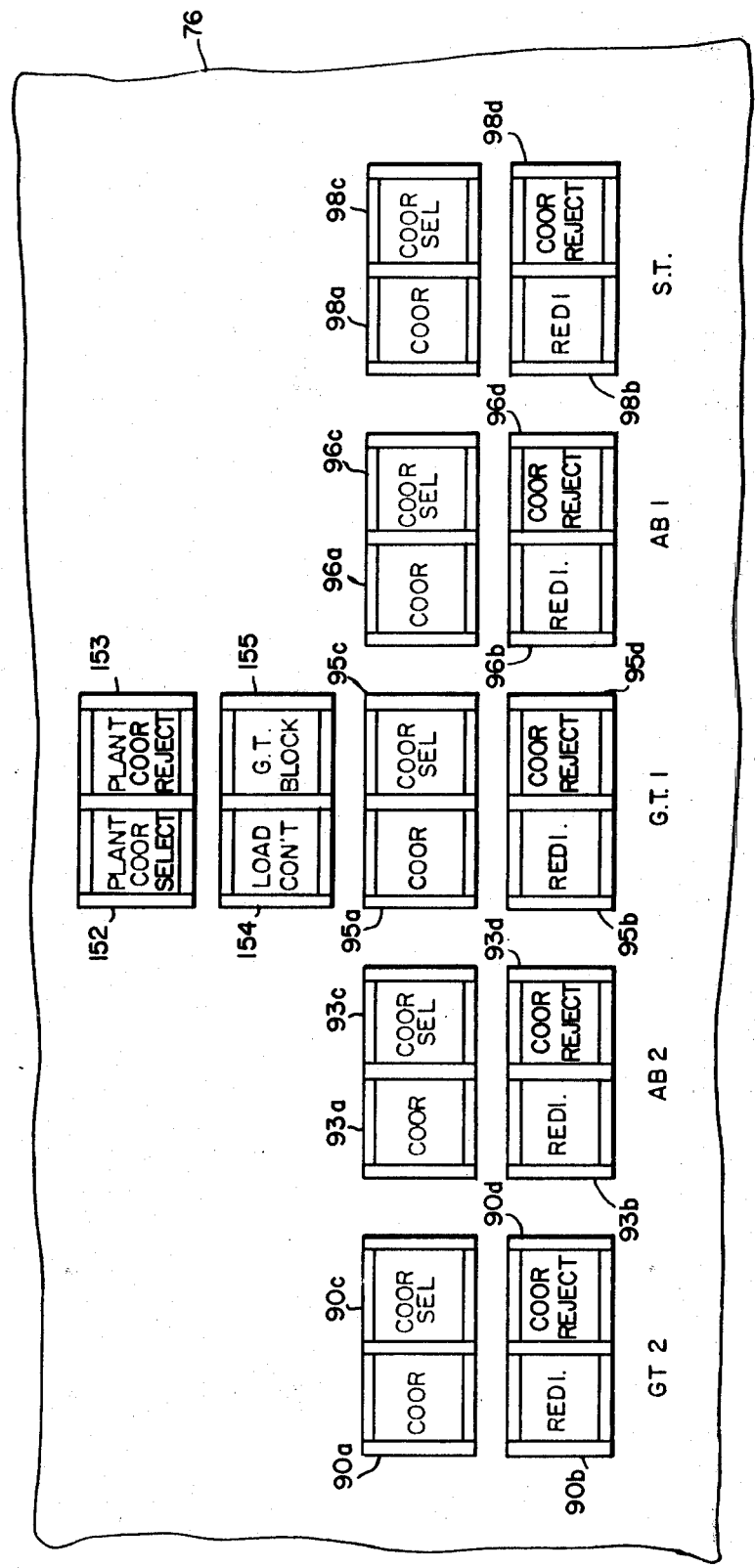
FIG. 19 is a representation of a portion of the operator panel dealing with coordinated control.

FIG. 19 shows in a portion of the operator panel which provides for selecting or rejecting coordinated control for the plant or any combination. As indicated in FIG. 19, there is included an array of backlighted pushbutton switches and status lights which are mounted on a portion 76 of the operator control panel.

Items in the 90, 93, 95, 96 and 98 series which have suffix letters "a" and "b" are status lights. Items in these series which have suffix letters "c" and "d" are spring-loaded backlighted pushbuttons which are lit when the switch contacts associated with the buttons are closed. A first momentary depression of one of these pushbuttons will close its switch contacts and the next momentary depression will open its switch contacts. Items 152–155 are spring-loaded backlighted pushbuttons which are used in establishing the different operating modes for the control system 50.

Considering the pushbuttons 95c and 95d for GT1, for example, the "coordinated select" button 95c is depressed if it is desired to have GT1 operate in the plant coordinated mode. If, on the other hand, it is desired to have GT1 operate in the operator automatic mode, then the "coord reject" pushbutton 95d is depressed. The depressing of either button 95c or 95d does not cause the actual change in mode. The actual transfer from one mode to the other occurs when one or the other of mode transfer buttons 152 and 153 is depressed. In other words, when the plant coordinated button 152 is depressed, then all of the individual units which have their coordinated select buttons switch contacts closed are at that moment transferred to the plant coordinated mode. In a similar fashion, the depressing of the plant operator pushbutton 153 causes a transfer to the operator automatic mode of those units for which the switch contacts have been closed by a depressing of their operator select pushbuttons. Transfer pushbuttons 152 and 153 are effective to provoke mode changes in the load distribution control unit 73, while mode transfer buttons 154 and 155 are effective to initiate mode changes in the load reference logic 72.

Considering now the status lights having the suffix a and b designations, the "redi" light having the "b" designation is lit if the particular unit in question is in the operator automatic mode and is in a ready condition or proper condition to be transferred to the plant coordinated mode. If then the coordinated select button "c" for that unit is depressed to light same and if the plant coordinated transfer button 152 is thereafter depressed, the "redi" light "b" goes out and the coordinated light "a" comes on. The lighting of the coordinated light "a" indicates that the transfer to the plant coordinated mode has been accomplished and that such unit is now operating in such mode. Conversely, if the "redi" light "b" is lit, then the unit in question is operating in the operator automatic mode. Remaining portions of the control panel, not shown, provide similar switching into and out of the operator analog and manual modes of operation.

Figure 20:
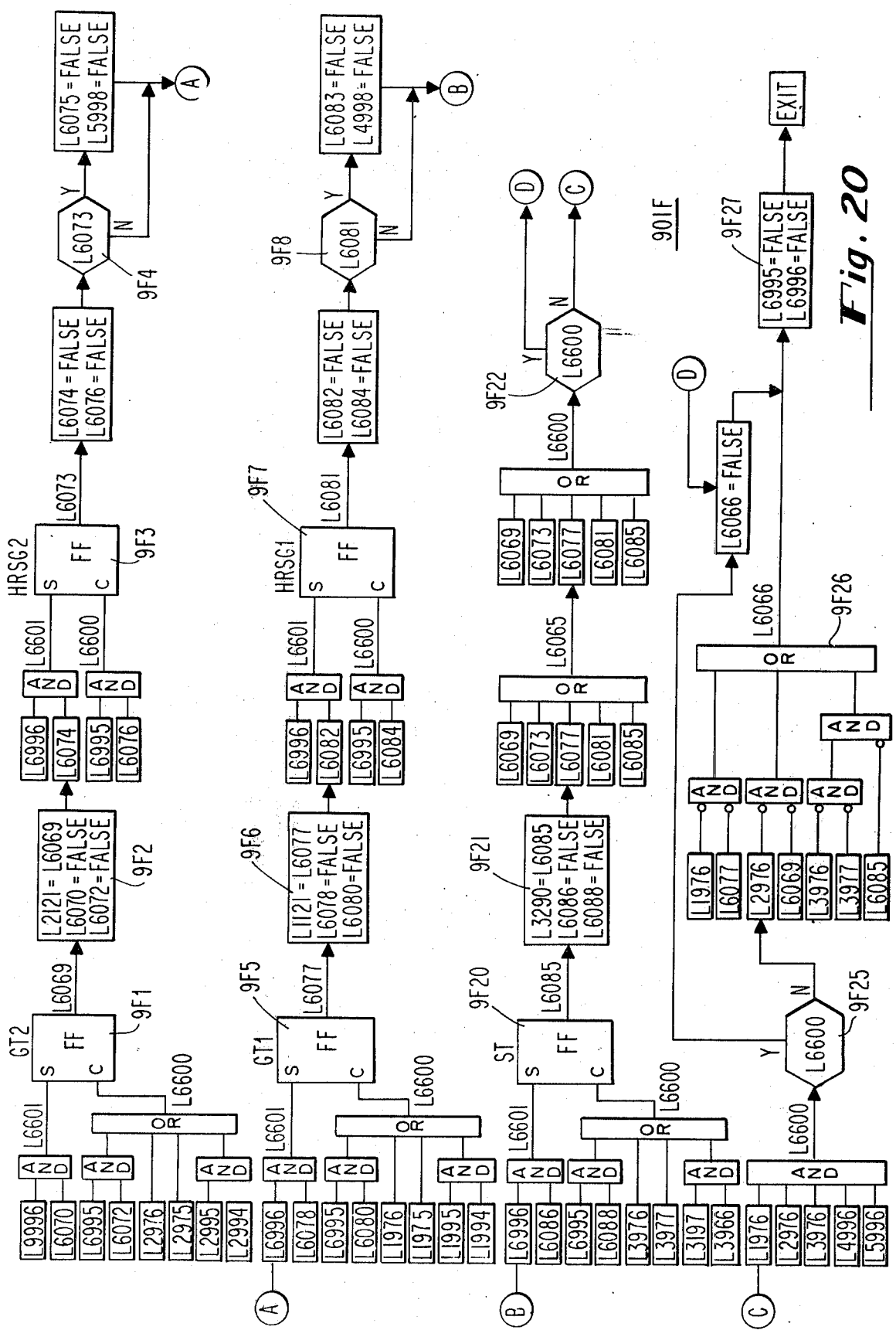
FIG. 20 is a flow chart of the select/reject logic program for going into or out of coordinated control.

Reference is made to FIG. 20, which is a diagram of a 9-level program for going into or out of coordinated control. This program is usually initiated at operator request, as by pushing the buttons of FIG. 19. In certain cases, it may be bid from other prior-bid programs. The diagram illustrates the logic followed for setting a large number of the logic variables which are utilized in coordinated control programs. At blocks 9F1–9F8, 9F20–9F22 and 9F25–9F27, logic states are established and decisions made concerning establishment of logic states. Also, not shown, the digital control computer contains a large number of other subroutines for interfacing between the coordinated control software and the BGT Board, and for monitoring plant contact inputs, which subroutines are operated by demand, upon interruption, or when one of the coordinated control select or reject buttons is pushed.

In review, there is disclosed a digital computer control system, adapted to operate cooperatively with a back-up analog control system, the digital control system having a plurality of control levels, and further having the flexibility of controlling different configurations of turbines and afterburner elements at given ones of the different control levels. The highest level of control is coordinated control, in which mode the plant can be loaded when the appropriate turbine breakers are closed. The digital computer provides for operation in the coordinated control mode, whereby any combination of the three turbines and two afterburners can be put in coordinated control, subject to the prior condition that the respective turbines have been synchronized and their breakers are closed, i.e. they are carrying load. Each of the digital levels, 9, 8 and 7, have a select operating mode package for carrying out the selection process. At the 9-level of operation, program 9008 is the select operating mode package which checks logic conditions and sets logic variables for use in the remaining 9-level packages. Likewise, the ST/BPV control package has a plurality of programs, one of which is the select operating mode, and each of the two GT control packages likewise has a plurality of programs, one of which is the select operation mode program. Thus, every time that the digital computer sequences through the various priority levels, at each level the logic conditions are checked to determine which elements are in what mode of control. Reference is made to the aforementioned prior applications which are incorporated by reference, wherein there is a further discussion of the elements of the ST/BPV control block package, the GT1 and the GT2 control packages.

It is to be noted that whenever the digital control computer 58G is operating, all of the various periodically bid levels are sequenced, i.e. first the 9 level is sequenced, then the 8 level is sequenced, and then the 7 level is sequenced. This statement is true, no matter what mode of plant control has been selected. If the plant is in coordinated control, the 9 level programs are carried out, with the control functions being fully determined for each turbine which is in coordinated control. If the plant is in operator automatic control, or any given turbine is in operator automatic control, the 9 level programs are still carried out, but the corresponding sequential steps are modified subject to the logic conditions, such that the 9 level programs effectively skip many of the control functions and bid to the next level. The 8 and 7 level programs are sequenced in a similar fashion, in both of the digital computer modes.

It is to be noted that the boiler control functions, as illustrated in FIG. 3, are analog controlled by the analog control center, from stand by to full load. However, the gas temperature setpoint (afterburner) control signals generated in programs 9002/9003 are also connected to the boiler control circuitry, for supervision of the boiler control operation.

When in plant coordinated control, both gas turbines are operated together. Start-up sequencing of the gas turbines is done in the GT1 and GT2 control packages, respectively. These packages generate control signals, as shown in FIG. 9, which operate the gas turbine valves 14 and 24 and the input guide vanes 15 and 25. However, both gas turbines need not be in coordinated control since separate control packages are provided for them, such that either GT control package can accept signals generated in program 9006, as in coordinated control, or from operator inputs, as in the other modes of control. Likewise, when in plant coordinated control both afterburners are operated together, but each is provided with a separate control package. The ST/BPV control package contains a program for monitoring the steam throttle pressure state, which is sensed by one of the sensors 101C and communicated to the control computer, and for generating a steam turbine load rate control signal as a function of such sensed pressure state, whereby the steam turbine may be loaded automatically, simply by the operator telling it to go. Afterburner control may be either coordinated or operator analog. In both cases, both the ACC and DCC generate control signals, but when in the coordinated mode the digital signals supplant the analog signals.

In the coordinated control mode, the two primary control paths are (1) that which generates the gas turbine fuel valve and IGV controls, and (2) the one which generates the gas temperature set point controls, or afterburner controls. Each of these is adjusted by a plant load error signal representative of overall plant loading. A primary feature of the afterburner path is the incorporation of the means for generating the feedforward gas turbine setpoint signal as a function of a stored array which is predetermined in order to maintain afterburner operation between a minimum of 750° F. (which is required to obtain a minimum steam temperature of 700° F.) and a predetermined maximum afterburner inlet temperature. By precisely maintaining the gas temperature at the inlet to the afterburner, the steam turbine load is maintained in a following mode from the gas turbine operation.

APPENDIX I
PROCESS LOGIC VARIABLES

| L1079 | GT1 Flame On CI | L3183 | ST Hot Standby Monitor |

-continued

| | | | |
|---|---|---|---|
| L1082 | GT1 4X CI | | Lamp |
| L1090 | GT1 Trip Reset CI | L3184 | ST ACC Monitor Lamp |
| L1121 | GT1 Coord. Button Lamp | L3188 | ST Follow |
| L1965 | GT1 Auto Sync Reject | L3197 | ST MW Unreliable |
| L1966 | GT1 Auto Start | L3225 | Hold/State and Lamp |
| L1971 | GT1 Auto Sync | L3231 | AB/State and Lamp |
| L1975 | GT1 IGV Manual | L3290 | ST Coord. Button Lamp |
| L1976 | GT1 Fuel Valve Manual | L3299 | ST Coord. Trip |
| L1994 | GT1 Breaker Flip Flop | L3953 | ST Standby |
| L1995 | GT1 MW Unreliable | L3954 | ST Hot Standby |
| L2079 | GT2 Flame On CI | L3963 | ST Auto Start |
| L2082 | GT2 4X CI | L3965 | ST Auto Sync Reject |
| L2090 | GT2 Trip Reset CI | L3966 | ST Bkr FF |
| L2121 | GT2 Coord. Button Lamp | L3971 | ST Auto Sync |
| L2965 | GT2 Auto Sync Reject | L3976 | ST Control Valves Manual |
| L2966 | GT2 Auto Start | L3977 | ST BPV Manual |
| L2971 | GT2 Auto Sync | L3994 | AB Hold |
| L2975 | GT2 IGV Manual | L3998 | ST Control Valves Open |
| L2976 | GT2 Fuel Valve Manual | L3999 | ST Latch |
| L2994 | GT2 Bkr FF | L4001 | HRSG1 START AB CO |
| L2995 | GT2 MW Unreliable | L4002 | HRSG1 RUN CO |
| L3106 | One Condensate Pump Runback | L4003 | HRSG1 STANDBY CO |
| L3182 | ST Standby Monitor Lamp | L4004 | AB1 Stop CO |
| L4005 | AB1 Auto CO | L6014 | Standby Status Lamp CO |
| L4051 | HRSG1 STANDBY CI | L6015 | Hot Standby Status Lamp CO |
| L4052 | HRSG1 Trip Contact Input | L6016 | Run Status Lamp CO |
| L4053 | HRSG1 RUN CI | L6019 | HRSG2 Flame Status Lamp |
| L4054 | HRSG1 AB Flame On CI | L6023 | AB Min Status Lamp CO |
| L4055 | HRSG1 Plant Runback CI | L6024 | AB Reg Status Lamp CO |
| L4056 | SH1 Outlet Temp Change >7.5° C. F/Min CI | L6025 | AB Max Status Lamp CO |
| L4061 | HRSG1 Dry CI | L6027 | ST Standby Status Lamp |
| L4998 | AB1 Ready For Coord. | L6028 | ST Hot Standby Status Lamp |
| L4999 | New Value Entered | L6033 | ST ACC Status Lamp |
| L5001 | HRSG2 Start AB CO | L6034 | ACC Hold Status Lamp |
| L5002 | HRSG2 Run CO | L6039 | HRSG1 Dry Status Lamp CO |
| L5003 | HRSG2 Standby CO | | |
| L5004 | AB2 Stop CO | L6040 | Standby Status Lamp CO |
| L5005 | AB2 Auto CO | L6041 | Hot Standby Status Lamp CO |
| L5051 | HRSG2 Standby CI | L6042 | Run Status Lamp CO |
| L5052 | HRSG2 Trip Contact Input | L6045 | HRSG1 Flame Status Lamp |
| L5053 | HRSG2 Run CI | | |
| L5054 | HRSG2 AB Flame On CI | L6049 | AB Min Status Lamp CO |
| L5055 | HRSG2 Plant Runback CI | L6050 | AB Reg Status Lamp CO |
| L5056 | SH2 Outlet Temp Change >7.5° C. F/Min CI | L6051 | AB Max Status Lamp CO |
| L5061 | HRSG2 Dry CI | L6065 | Plant Coord. |
| L5996 | AB2 Manual | L6066 | Plant Auto |
| L5998 | AB2 Ready for Coord. | L6067 | Load Control Button Lamp |

-continued

| | | | |
|---|---|---|---|
| L6013 | HRSG2 Dry Status Lamp | | |
| L6068 | GT Button Lamp | L6086 | Coord. Panel Coord. Select ST/State and Lamp |
| L6069 | GT2 Coord. | | |
| L6070 | Coord. Panel Coord. Select GT2/State and Lamp | L6087 | Coord. Panel Ready ST/State and Lamp |
| L6071 | Coord. Panel Ready GT2/ State and Lamp | L6088 | Coord. Panel Coord. ST/State and Lamp OR ST COORD. Reject Lamp |
| L6072 | Coord. Panel OP Auto Select GT2/State and Lamp OR GT2 Coord. Reject Lamp | L6090 | Control Coord. Keyboard Enable CO |
| L6073 | HRSG2 COORD. - HRSG2 in coordinated control | L6091 | Coord. Hold |
| L6074 | HRSG2 COORD. Select | L6092 | Coord. GO |
| L6075 | HRSG2 Ready for Coord. | L6093 | Normal Stop |
| L6076 | HRSG2 Coord. Reject OR COORD. PANEL Op Auto Select HRSG2/State and Lamp | L6094 | Tuning Switch Lamp |
| | | L6100 | Tuning Switch CI |
| | | L6102 | Control Coord. Keyboard Enable CI |
| L6077 | GT1 Coord. | | |
| L6078 | Coord. Panel Coord. Select GT1/State and Lamp | L6104 | BTG Power Fail CI |
| | | L6154 | Coord. Reject Ann. CO |
| L6079 | Coord. Panel Ready GT1/ State and Lamp | L6155 | Auto Sync Reject Ann. CO |
| L6080 | Coord. Panel Op Auto Select GT1/State and Lamp OR GT1 Coord. Reject Lamp | L6157 | Plant Demand Runback CO |
| | | L6158 | Plant Load Unit - One |
| L6081 | HRSG1 COORD. - HRSG1 in coordinated control | L6161 | GT1 Trip Ann. CO |
| L6082 | Coord. Select Button and Lamp, HRSG1 | L6162 | HRSG1 Trip Ann. CO |
| | | L6163 | GT2 Trip Ann. CO |
| L6083 | Coord. Panel Ready HRSG1/ State and Lamp | L6164 | HRSG2 Trip Ann. CO |
| L6084 | Op Auto Select HRSG1 Button and Lamp, OR HRSG1 OP Coord. Reject | L6166 | Control Message Ann. CO |
| | | L6167 | Data Link on AD Converter Fail CO |
| L6085 | ST COORD. | | |
| L6980 | COORD. ST UNLOAD | L6991 | Delay Control Message Ann. Clear |
| L6982 | Keyboard Valid | | |
| | | L6995 | Plant Op Auto Button Pushed |
| L6985 | Computed GO/HOLD Reset | | |
| L6986 | Computed Hold | L6996 | Local Plant Coord. Button |
| L6987 | Hold Button Pushed | | |
| | | L6997 | Data Link Not Operating |
| L6988 | GO Button Pushed | | |
| | | L6998 | A/D Convertor Failure |
| L6990 | Coord. Unload (AB Unload?) | L6999 | NORMAL STOP BUTTON PUSHED |

PROCESS REAL VARIABLES

| | | | |
|---|---|---|---|
| V1104 | GT1 MW | V4998 | AB1 NHC Output (Set Point) |
| V1961 | GT1 Exh T | | |
| | | V5998 | AB2 NHC Output (Set Point) |
| V1978 | GT1 Coord. Load Rate | | |
| V1979 | GT1 Coord. Demand | V6971 | GT MW Feedback Factor |
| V1992 | GT1 Reference | V6972 | AB MW Feedback Factor |
| V2104 | GT2 MW | V6973 | MW Controller Last Input |
| V2961 | GT2 Exh T | | |
| | | V6974 | MW Controller Integral Output |
| V2978 | GT2 Coord. Load Rate | | |
| V2979 | GT2 Coord. Demand | V6975 | MW Controller Total Output |
| V2992 | GT2 Reference | | |
| | | V6976 | ST Last MW |
| V3104 | ST MW | | |
| | | V6977 | GT2 Last MW |
| V3978 | ST Coord. Load Rate | | |
| | | V6978 | GT1 Last MW |
| V3979 | ST Coord. Demand | | |

| | | | |
|---|---|---|---|
| | | V6985 | GT2 Tracking Ramp Output |
| V4081 | SH1 Outlet Pressure | | |
| V4995 | AB1 Tracking Ramp | V6986 | GT2 Tracking Bias |
| V4996 | AB1 Tracking Bias | V6987 | GT1 Tracking Ramp Output |
| V4997 | AB1 Set Point | | |
| V6988 | GT1 Tracking Bias | V6993 | Coord. Demand |
| V6989 | Normal Stop Ramp | V6994 | Coord. Load Rate |
| V6990 | AB Characterized GT Exh T | V6998 | Total GT Load Demand |
| V6991 | AB Gas Temp Set Point | V6999 | Plant MW |
| V6992 | Coord. Reference | | |
| | CONSTANTS | | |
| K3991 | ST Min Load | K6981 | AB Min Set Point |
| K3992 | ST Max Demand | K6982 | MW/GT Controller Ranging Gain |
| K4997 | Tracking Dead Bank | | |
| | | K6989 | GT2 Tracking Ramp Rate |
| K4998 | Tracking Ramp Rate | | |
| | | K6990 | GT1 Tracking Ramp Rate |
| K4999 | Zero | | |
| | | K6991 | MW/AB Controller Ranging Gain |
| K5996 | Coord. Min Demand, No AB | | |
| K6890 | GT Exh T/AB Array | K6992 | Plant Max Demand |
| K6950 | MW Controller Array | K6993 | MW Controller Ramp Rate |
| K6978 | Min Coord. Load Demand With No AB | K6996 | Plant Runback Rate |
| K6980 | AB Max Set Point | K6998 | Normal Stop AB Ramp Rate |

What is claimed is:

1. A control system for an electric combined cycle power plant having at least a gas turbine and a steam turbine and a heat recovery steam generator interconnected in a heat cycle to provide motive energy for driving said turbines, means for generating electric power in response to mechanical drive power from said turbines, said control system comprising a gas turbine control and a steam turbine control each being a portion of a digital control center and an analog control center, said digital and analog control centers providing means for a plurality of control modes at respective different levels of automation, the steam turbine control including means for providing at least two modes of control for automatically loading and unloading said steam turbine as a function of sensed steam pressure at a predetermined point in said steam turbine.

2. The electric power plant as described in claim 1, wherein said digital control center comprises stored program means for carrying out the function of selecting which ones of the turbines of said combined cycle power plant are selected for coordinated control, coordinating the loading and unloading of said turbines, and determining the load and unload rate of said steam turbine as a function of a predetermined throttle steam pressure characteristic.

3. The combined cycle plant as described in claim 2, wherein the functions of selecting which turbines are in coordinated control, determining coordinated load distribution, and determinating the steam turbine load and unload rates are carried out periodically and in a predetermined sequence.

4. The combined cycle electric power plant as described in claim 3, comprising means for accepting operator inputs for determining load distribution to said steam turbine, and wherein said digital control center stored program means comprises means for automatically controlling the rate of change of load of said steam turbine when said steam turbine is or is not under coordinated control, said program means also operating on said inputs and automatically determining load and unload rates according to said predetermined function in order to load and unload said steam turbine.

5. A control system for an electric combined cycle power plant having at least a gas turbine and a steam turbine and a heat recovery steam generator interconnected in a heat cycle to provide motive energy for driving said turbines, means for generating electric power in response to mechanical drive power from said turbines, said control system comprising:
   a. means for coordinating generation of load control signals for controlling said gas turbine and said steam turbine;
   b. means for generating steam load rate control signals as a selected function of a predetermined steam turbine operating condition;
   c. means for controlling said steam turbine as a function of said coordinated load control signals and said steam load rate control signal;
   d. means for providing a plurality of control modes for operating said coordinating means and said generating means at different levels of automation.

6. The control system as described in claim 5, wherein said operating condition is steam turbine throttle pressure, and comprising analog means for measuring said throttle pressure.

7. The control system as described in claim 6, wherein said load rate means comprises a first array of stored information from which said selected function is derived during steam turbine loading.

8. The control system as described in claim 7, wherein said load rate means comprises a second array of stored information from which said selected function is derived during unloading.

9. The control system as described in claim 8, comprising means for determining when said steam turbine is loading and when it is unloading, and selection means for selecting one of said two arrays in accordance with said determination.

10. The control system as described in claim 9, wherein said coordinating means and said steam load rate means both operate in a first of said modes and said load rate generating means operate without said coordinating means in a second mode, and means for selecting one of said modes.

11. In a combined cycle electric power plant having at least a gas turbine and a steam turbine and a heat recovery steam generator interconnected in a heat cycle to provide motive energy for driving said turbines, a method of controlling the load operation of said turbines comprising:
   a. controlling the temperature of the steam from said steam generator as a predetermined function of the operation of said gas turbine;
   b. controlling the load rate of said steam turbine as a predetermined function of throttle steam pressure;
   c. selecting one of a plurality of control modes and carrying out said temperature and load rate controlling steps at different selective levels of automation.

12. The method as described in claim 11, comprising periodically monitoring said throttle steam pressure, and periodically carrying out said monitoring, steam temperature controlling, and load rate controlling steps in a predetermined sequence.

13. The method as described in claim 12, wherein said power plant includes an afterburner for receiving exhaust gas from said gas turbine, imparting additional heat thereto and delivering said heated gas to said steam generator, and comprising the further step of automatically coordinating the load operation of said steam turbine, gas turbine and afterburner.

14. The system as described in claim 1, wherein said steam turbine control comprises first means for controlling said steam turbine either so that it is held at minimum load or can follow said gas turbine operation up to maximum load, and second means for controlling the load and unload rates of said steam turbine as a function of sensed steam pressure.

15. The system as described in claim 14, wherein said control system comprises a programmed digital computer, said computer comprising a first subsystem at a first operating level incorporating said first means, and a second subsystem at a second operating level incorporating said second means.

* * * * *